US008259553B2

(12) United States Patent
Nakano et al.

(10) Patent No.: US 8,259,553 B2
(45) Date of Patent: Sep. 4, 2012

(54) OPTICAL PICKUP AND OPTICAL DISC DEVICE

(75) Inventors: Fumiaki Nakano, Tokyo (JP); Nobuhiko Ando, Tokyo (JP); Noriaki Nishi, Kanagawa (JP); Takashi Nakao, Tokyo (JP); Hiroaki Nakagawa, Tokyo (JP); Yutaka Tentaku, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/703,294

(22) Filed: Feb. 10, 2010

(65) Prior Publication Data

US 2010/0214902 A1  Aug. 26, 2010

(30) Foreign Application Priority Data

Feb. 24, 2009 (JP) ................................ 2009-041054

(51) Int. Cl.
*G11B 7/135* (2012.01)
(52) U.S. Cl. ................................................. 369/112.03
(58) Field of Classification Search ........................ None
See application file for complete search history.

(56) References Cited

U.S. PATENT DOCUMENTS

| 2007/0195664 A1* | 8/2007 | Kadowaki et al. ......... 369/44.37 |
| 2008/0094948 A1* | 4/2008 | Kamisada et al. ......... 369/44.11 |
| 2008/0101199 A1* | 5/2008 | Yamasaki et al. ......... 369/112.1 |
| 2009/0028035 A1* | 1/2009 | Sano et al. ............... 369/112.03 |

FOREIGN PATENT DOCUMENTS

| JP | 2005-108359 A | 4/2005 |
| JP | 2006-294215 A | 10/2006 |
| JP | 2007-213754 A | 8/2007 |
| JP | 2008-135151 A | 6/2008 |
| JP | 2008-135155 A | 6/2008 |

* cited by examiner

*Primary Examiner* — Peter Vincent Agustin
*Assistant Examiner* — Emily Frank
(74) *Attorney, Agent, or Firm* — Wolf, Greenfield & Sacks, P.C.

(57) ABSTRACT

An optical pickup includes: a light source outputting a light beam; an objective lens collecting the light beam on a target recording layer as a target of plural recording layers provided in an optical disc; a lens moving unit moving the objective lens in a tracking direction nearly orthogonal to track grooves helically or coaxially formed in the target recording layer; a collective lens collecting a reflected light beam formed when the light beam is reflected by the optical disc; a diffraction optical element diffracting part of the reflected first-order light beam in predetermined directions as first, second, third and fourth beams; and a photodetector receiving the first and second beams using first and second light receiving areas, and generating light reception signals, and receiving the third and fourth beams using third and fourth light receiving areas, and generates light reception signals.

15 Claims, 18 Drawing Sheets

CONFIGURATION OF HOLOGRAM IN RELATED ART

APPLICATION CONDITION OF INTERLAYER STRAY LIGHT IN RELATED ART (1)

APPLICATION CONDITION OF INTERLAYER STRAY LIGHT IN RELATED ART (2)

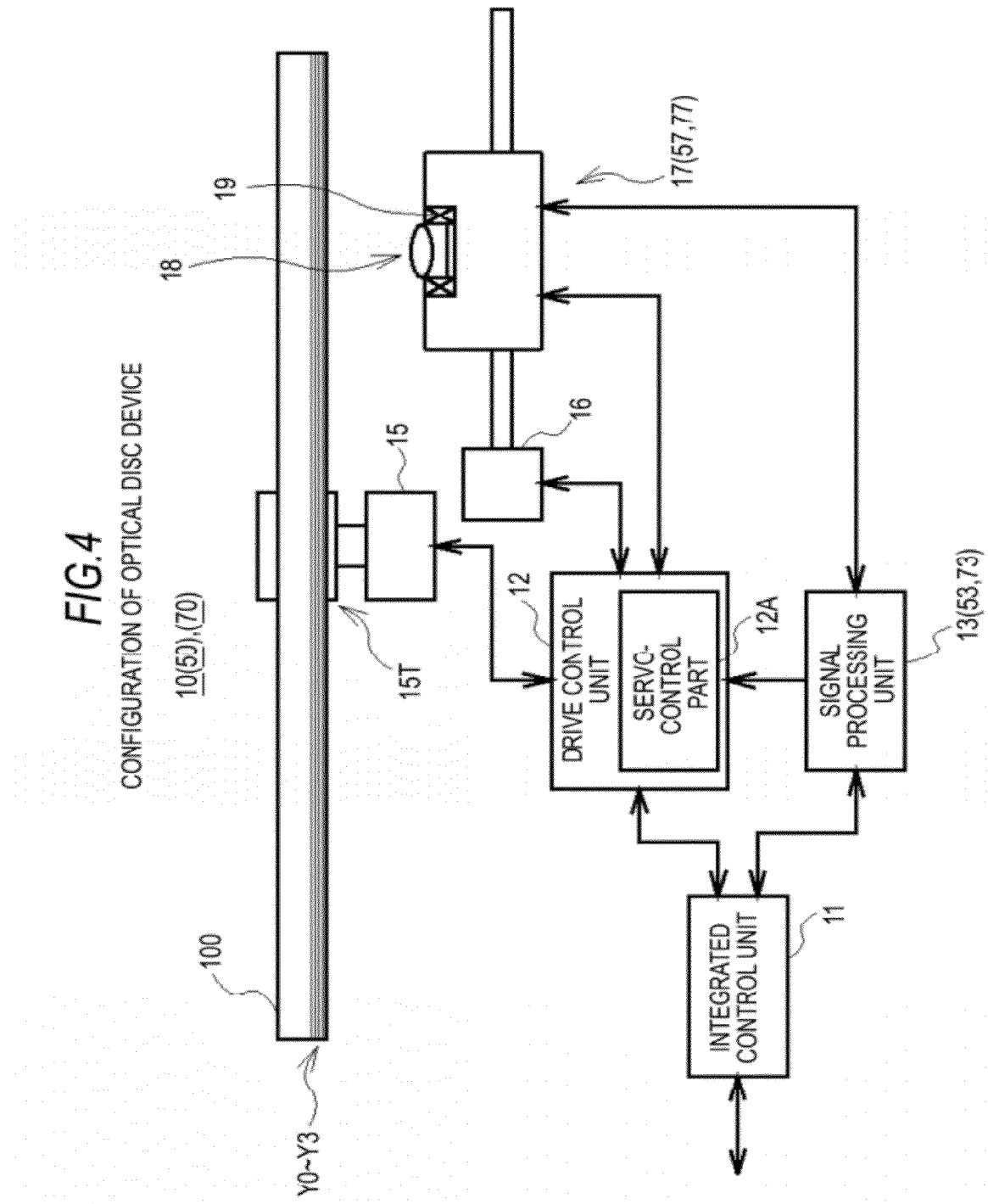

GENERATION OF REFLECTED LIGHT BEAMS AND INTERLAYER STRAY LIGHT BEAMS

WHEN RECORDING LAYER Y0 IS TARGET RECORDING LAYER

WHEN RECORDING LAYER Y3 IS TARGET RECORDING LAYER

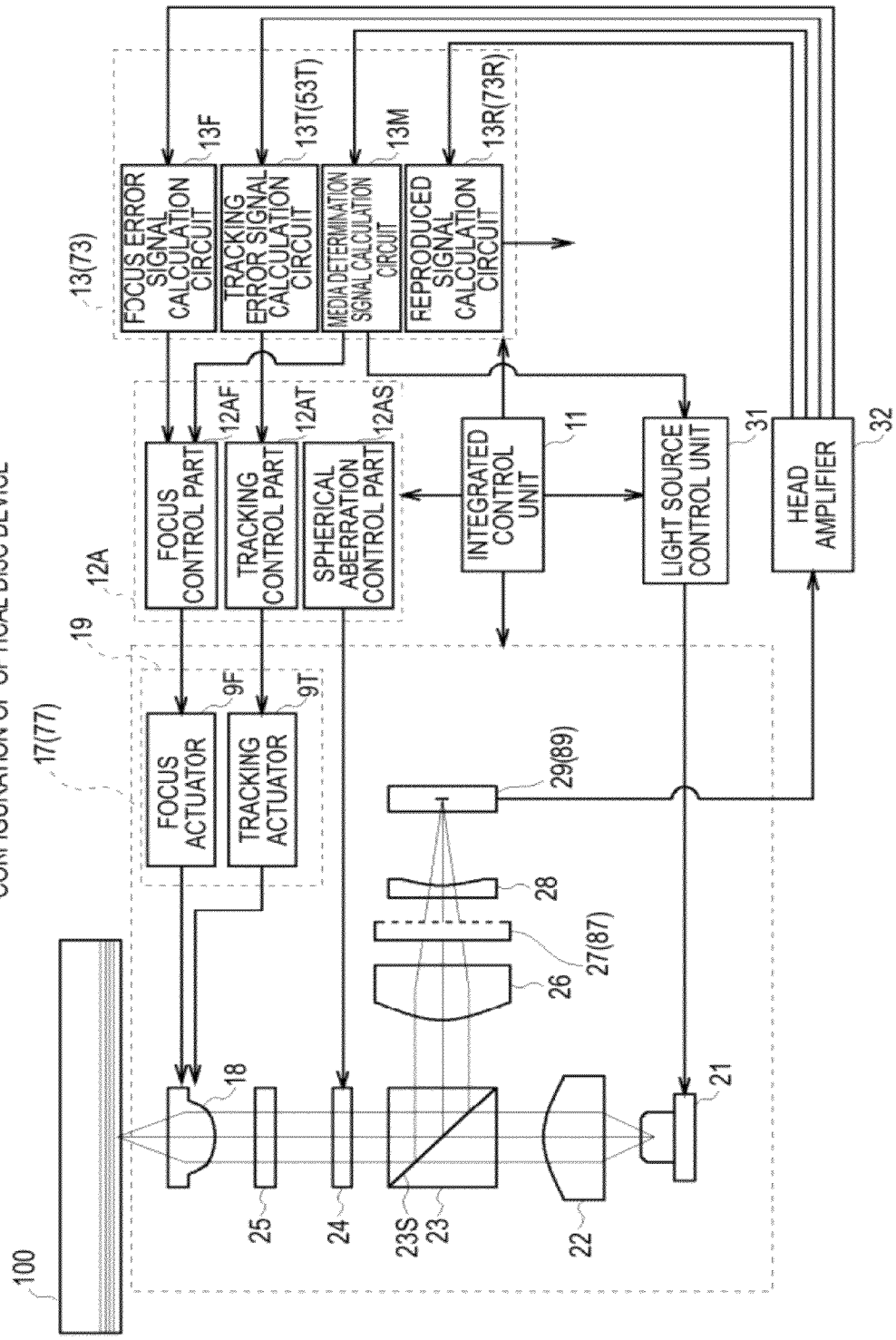

CONFIGURATION OF HOLOGRAM ELEMENT

STATE OF SEPARATION OF REFLECTED LIGHT BEAM ACCORDING TO FIRST EMBODIMENT

FORMATION OF STRAY LIGHT PATTERN (1)

FORMATION OF STRAY LIGHT PATTERN (2)

FORMATION OF STRAY LIGHT PATTERN (3)

FORMATION OF STRAY LIGHT PATTERN DIFFRACTED BY OTHER LAYERS

MOVEMENT OF APPLICATION POSITION OF REFLECTED LIGHT BEAM DUE TO LENS SHIFT

FORMATION OF STRAY LIGHT PATTERN (4)

FIG.16
FORMATION OF STRAY LIGHT PATTERN DIFFRACTED BY OTHER LAYERS IN RELATED ART
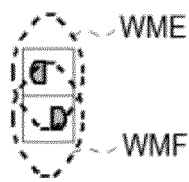
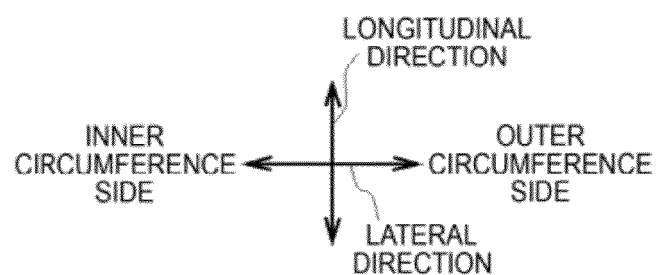
FIG.17
FORMATION OF STRAY LIGHT PATTERN (5)
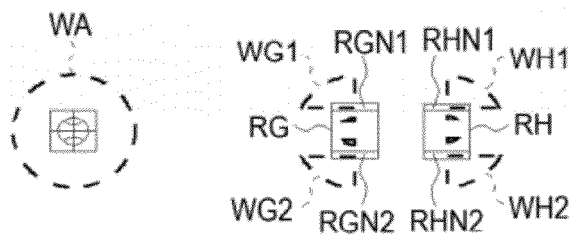
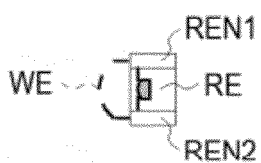
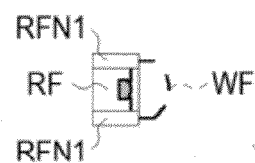
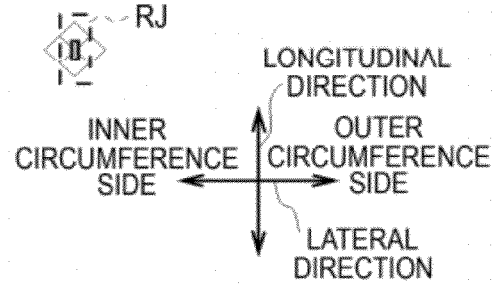

RELATIONSHIPS BETWEEN STRAY LIGHT LAYER DISTANCE AND AMOUNT OF LIGHT WHEN LENS SHIFT OCCURS

STATE OF SEPARATION OF REFLECTED LIGHT BEAM ACCORDING TO THIRD EMBODIMENT

FORMATION OF STRAY LIGHT PATTERN ACCORDING TO THIRD EMBODIMENT

OPTICAL PICKUP AND OPTICAL DISC DEVICE

BACKGROUND OF THE INVENTION

1. Field of the Invention

The present invention relates to an optical pickup and an optical disc device, and is suitable for application to an optical disc device compliant with an optical disc having plural recording layers, for example.

2. Background Art

In related art, optical disc devices that apply a light beam is applied to an optical disc such as a CD (compact disc), a DVD (Digital Versatile Disc), and a Blu-ray Disc (registered trademark, called BD as below) and read the reflected light thereof for reproduction of information have been widely spread.

In the optical disc, information to be recorded is coded and modulated, and recorded as pits or the like on helically or coaxially formed tracks.

Accordingly, in the optical disc device, the light beam is collected using an objective lens, and the light beam is focused on the tracks helically or coaxially formed on the recording layer of the optical disc when the information is reproduced from the optical disc.

The optical disc device receives the reflected light by providing a light receiving area having a predetermined shape in a photodetector. The optical disc device calculates a focus error signal and a tracking error signal representing amounts of shift between the track to which the light beam should be applied (hereinafter, referred to as a target track) and the focal point of the light beam with respect to the focus direction and the tracking direction based on the light reception result, respectively.

Subsequently, the optical disc device moves the objective lens in the focus direction based on the focus error signal and moves the objective lens in the tracking direction based on the tracking error signal, and thereby, focuses the light beam on the target track.

Some optical discs have two recording layers and reflect the light beam on the respective recording layers at respective predetermined reflectances. For the optical disc, the optical disc device is arranged to make control of focusing the light beam on a desired recording layer and detect the reflected light thereof.

Here, in the optical disc device, interlayer stray light formed by reflection of a part of the light beam on the other recording layer than the desired recording layer may be applied to the light receiving area of the photodetector. In this regard, there is a possibility that the optical disc device may not accurately perform tracking control because an error occurs in the tracking error signal due to the interlayer stray light.

Further, regarding the optical disc, it is conceivable that four or six recording layers, for example, are provided to increase the recording capacity. It is considered that, in such an optical disc, the layer distance between the closest (i.e., adjacent) recording layers may be smaller and the layer distance between the farthest recording layers may be larger compared to the layer distance of the optical disc having two recording layers in the past.

Accordingly, in the optical disc device, application conditions of the interlayer stray light may differ according to the interlayer distance between the desired recording layer and the other recording layer.

On this account, an optical disc device using a so-called one-beam push-pull method is proposed for avoiding the influence by interlayer stray light even when the number of recording layers is increased in an optical disc (e.g., see JP-A-2008-135131, FIG. 8).

In the optical disc device, the reflected light is diffracted in different directions (shown by arrows in the drawing) with respect to each area of reflected light using a hologram element 1 and the like as shown in FIG. 1, and the reflected light is received with respect to each area of reflected light by plural light receiving areas provided in a photodetector 2 as shown in FIG. 2.

As shown in FIGS. 1 and 2, the optical disc device diffracts the reflected light in the area containing a so-called push-pull component (main area) and the area containing a so-called lens-shift component (sub-area) of the reflected light in different directions.

Thereby, the optical disc device is adapted to prevent the application of the interlayer stray light to the light receiving area (shown by broken lines in the drawing) in the case of using any recording layer as the desired recording layer, or prevent occurrence of errors in the tracking error signal and the like even when the light is applied.

SUMMARY OF THE INVENTION

However, in principle, in the optical disc device, when the tracking control of moving the objective lens in the tracking direction, that is, when a lens shift occurs, the application condition of the interlayer stray light also changes.

Further, in the optical disc device, the application range of the interlayer stray light from the other recording layer at a small interlayer distance from the desired recording layer becomes smaller because the difference in optical path length from the reflected light beam is small, and closer to the light receiving area of the photodetector.

Accordingly, in the optical disc device, as shown in FIG. 3 corresponding to FIG. 2, when a lens shift occurs, the interlayer stray light from the other recording layer at a small interlayer distance from the desired recording layer may overlap with the light receiving area.

In this case, in the optical disc device, there is a problem that an error occurs in the tracking error signal, and the accuracy of the tracking control becomes lower.

Thus, there is a need for an optical pickup that can generate light reception signals enabling highly accurate tracking control even when an optical disc has many recording layers and a lens shift occurs, and an optical disc device that can perform highly accurate tracking control even when an optical disc has many recording layers and a lens shift occurs.

An optical pickup according to an embodiment of the invention includes: a light source that outputs a light beam; an objective lens that collects the light beam on a target recording layer as a target of plural recording layers provided in an optical disc; a lens moving unit that moves the objective lens in a tracking direction nearly orthogonal to track grooves helically or coaxially formed in the target recording layer; a collective lens that collects a reflected light beam formed when the light beam is reflected by the optical disc; a diffraction optical element that, when the reflected light beam is diffracted and separated into a reflected zero-order light beam and a reflected first-order light beam, diffracts a part of the reflected first-order light beam in a predetermined first direction as a first beam using a first area corresponding to a part containing +1-order rays diffracted by the track grooves of the reflected first-order light beam, diffracts a part of the reflected first-order light beam in a second direction different from the first direction as a second beam using a second area corresponding to a part containing −1-order rays diffracted by the track grooves of the reflected first-order light beam, diffracts a part of the reflected first-order light beam in a third direction different from either the first direction or the second direction as a third beam using a third area corresponding to a part hardly containing +1-order rays and −1-order rays diffracted by the track grooves of the reflected first-order light beam but corresponding to an inner circumference side of the optical disc, and diffracts a part of the reflected first-order light beam in the third direction as a fourth beam using a fourth area corresponding to a part hardly containing +1-order rays and −1-order rays diffracted by the track grooves of the reflected first-order light beam but corresponding to an outer circumference side of the optical disc; and a photodetector that receives the first beam and the second beam using a first light receiving area and a second light receiving area respectively provided at a side in the first direction and a side in the second direction in an application position of the reflected zero-order light beam, respectively, and generates light reception signals, and receives the third beam and the fourth beam using a third light receiving area and a fourth light receiving area respectively provided at sides in the third direction in the application position of the reflected zero-order light beam, respectively, and generates light reception signals, wherein a predetermined signal processing unit is allowed to generate a tracking error signal representing an amount shift of a focus of the light beam with respect to the tracking direction from a center line of the track grooves based on the light reception signals respectively generated by the first light receiving area, the second light receiving area, the third light receiving area, and the fourth light receiving area, and a predetermined servo-control part is allowed to move the objective lens in the tracking error direction via the lens moving unit based on the tracking error signal.

The optical pickup according to the embodiment of the invention can receive the first beam, the second beam, the third beam, and the fourth beam while the first light receiving area, the second light receiving area, the third light receiving area, and the fourth light receiving area are separated from each other. Further, the optical pickup can avoid the application of the interlayer stray light due to the second area of the optical diffraction element to the first light receiving area and the application of the interlayer stray light due to the first area of the optical diffraction element to the second light receiving area regarding the interlayer stray light generated by either of the recording layer closest to or farthest from the recording layer that collects the light beam.

Further, an optical disc device according to an embodiment of the invention includes: a light source that outputs a light beam; an objective lens that collects the light beam on a target recording layer as a target of plural recording layers provided in an optical disc; a lens moving unit that moves the objective lens in a tracking direction nearly orthogonal to track grooves helically or coaxially formed in the target recording layer; a collective lens that collects a reflected light beam formed when the light beam is reflected by the optical disc; a diffraction optical element that, when the reflected light beam is diffracted and separated into a reflected zero-order light beam and a reflected first-order light beam, diffracts a part of the reflected first-order light beam in a predetermined first direction as a first beam using a first area corresponding to a part containing +1-order rays diffracted by the track grooves of the reflected first-order light beam, diffracts a part of the reflected first-order light beam in a second direction different from the first direction as a second beam using a second area corresponding to a part containing −1-order rays diffracted by the track grooves of the reflected first-order light beam, diffracts a part of the reflected first-order light beam in a third direction different from either of the first direction or the second direction as a third beam using a third area corresponding to a part hardly containing +1-order rays and −1-order rays diffracted by the track grooves of the reflected first-order light beam but corresponding to an inner circumference side of the optical disc, and diffracts a part of the reflected first-order light beam in the third direction as a fourth beam using a fourth area corresponding to a part hardly containing +1-order rays and −1-order rays diffracted by the track grooves of the reflected first-order light beam but corresponding to an outer circumference side of the optical disc; a photodetector that receives the first beam and the second beam using a first light receiving area and a second light receiving area respectively provided at a side in the first direction and a side in the second direction in an application position of the reflected zero-order light beam, respectively, and generates light reception signals, and receives the third beam and the fourth beam using a third light receiving area and a fourth light receiving area respectively provided at sides in the third direction in the application position of the reflected zero-order light beam, respectively, and generates light reception signals; a signal processing unit that generates a tracking error signal representing an amount shift of a focus of the light beam with respect to the tracking direction from a center line of the track grooves based on the light reception signals respectively generated by the first light receiving area, the second light receiving area, the third light receiving area, and the fourth light receiving area; and a servo-control part that moves the objective lens in the tracking error direction via the lens moving unit based on the tracking error signal.

Thereby, the optical disc device of the embodiment of the invention can receive the first beam, the second beam, the third beam, and the fourth beam while the first light receiving area, the second light receiving area, the third light receiving area, and the fourth light receiving area are separated from each other. Further, the optical disc device can avoid the application of the interlayer stray light due to the second area of the optical diffraction element to the first light receiving area and the application of the interlayer stray light due to the first area of the optical diffraction element to the second light receiving area regarding the interlayer stray light generated by either of the recording layer closest to or farthest from the recording layer that collects the light beam.

According to the embodiments of the invention, the first beam, the second beam, the third beam, and the fourth beam can be received while the first light receiving area, the second light receiving area, the third light receiving area, and the fourth light receiving area are separated from each other. Further, in the embodiments of the invention, the application of the interlayer stray light due to the second area of the optical diffraction element to the first light receiving area and the application of the interlayer stray light due to the first area of the optical diffraction element to the second light receiving area regarding the interlayer stray light generated by either of the recording layer closest to or farthest from the recording layer that collects the light beam can be avoided respectively. Thus, the embodiments of the invention can realize the optical pickup that can generate light reception signals enabling highly accurate tracking control even when an optical disc has many recording layers and a lens shift occurs, and an optical disc device that can perform highly accurate tracking control even when an optical disc has many recording layers and a lens shift occurs.

BRIEF DESCRIPTION OF THE DRAWINGS

FIG. 4 is a schematic diagram showing an overall configuration of an optical disc device.

FIG. 6 is a schematic diagram showing a configuration of an optical pickup.

FIG. 16 is a schematic diagram for explanation of formation of a stray light pattern diffracted by other layers in related art.

FIG. 17 is a schematic diagram for explanation of formation of a stray light pattern (5).

DESCRIPTION OF PREFERRED INVENTION

Figure 1:
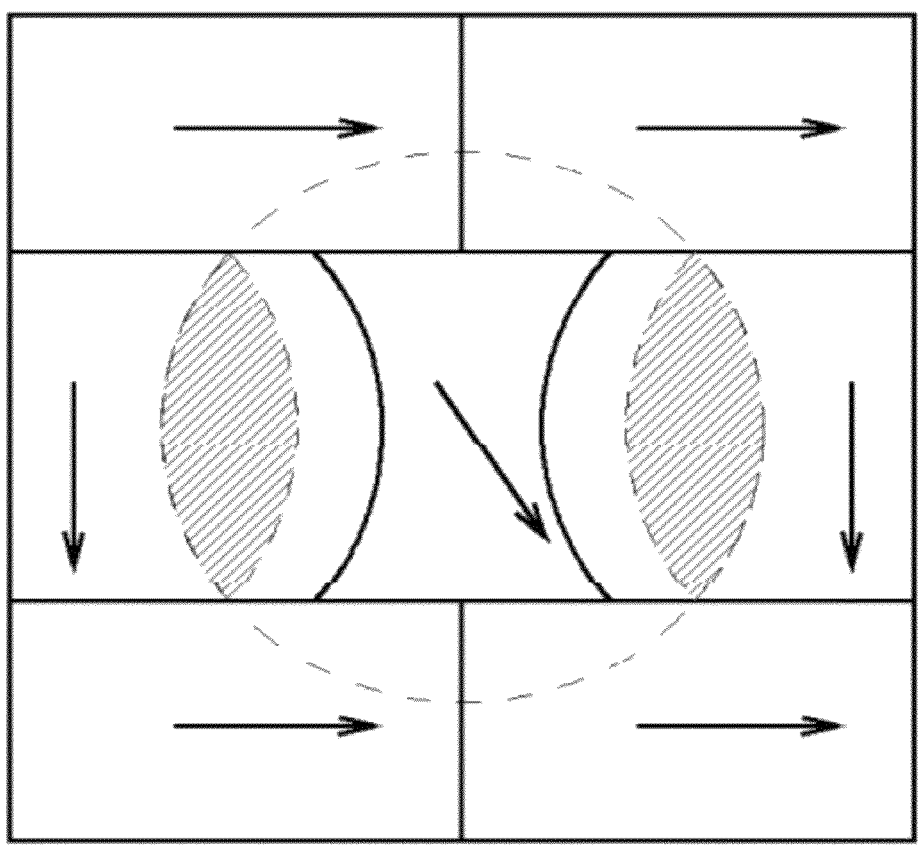
FIG. 1 is a schematic diagram showing a configuration of a hologram element in related art.
Figure 2:
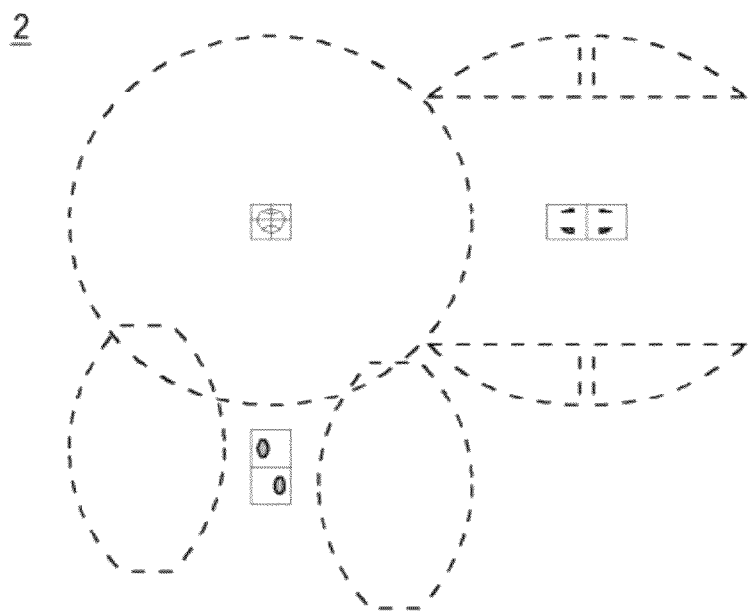
FIG. 2 is a schematic diagram showing an application condition of interlayer stray light in related art (1).

Hereinafter, modes for implementing the invention (hereinafter, referred to as embodiments) will be described with reference to the drawings. The explanation will be made in the following order.

1. First Embodiment (example using light reception result of stray light receiving area provided near light receiving area of push-pull component)

2. Second Embodiment (example also using light reception result of stray light receiving area provided near light receiving area of lens-shift component)

3. Third Embodiment (example of generating no zero-order ray with respect to partial areas of reflected light beam)

4. Other Embodiments

1. First Embodiment 1-1. Configuration of Optical Disc Device

As shown in FIG. 4, an optical disc device 10 mainly includes an integrated control unit 11, and is adapted to record information in an optical disc 100 and reproduce information from the optical disc 100.

The optical disc 100 has four recording layers Y0, Y1, Y2, and Y3 (hereinafter, collectively referred to as "recording layer Y"), for example, as shown by the sectional view in FIG. 5A. On each recording layer Y, helical or coaxial track grooves are formed, and information is recorded along the track grooves.

The integrated control unit 11 includes a CPU (Central Processing Unit) (not shown), a ROM (Read Only Memory) in which various programs etc. are stored, and a RAM (Random Access Memory) used as a work memory of the CPU.

When information is reproduced from the optical disc 100, the integrated control unit 11 rotatably drives a spindle motor 15 via a drive control unit 12 to turn the optical disc 100 mounted on a turn table 15T at a desired speed.

Further, the integrated control unit 11 is adapted to drive a sled motor 16 via the drive control unit 12 to greatly move an optical pickup 17 along a movement axis in a tracking direction, i.e., in a direction toward the inner circumference side or the outer circumference side of the optical disc 100.

To the optical pickup 17, plural parts of an objective lens 18, a biaxial actuator 19, etc. are attached, and the optical pickup is adapted to apply a light beam to the optical disc 100 according to the control of the integrated control unit 11.

In addition, the integrated control unit 11 is adapted to select the recording layer Y of the recording layers Y0 to Y3 as a target from which information is read out, i.e., the recording layer Y on which the light beam should be focused as a target recording layer YT.

Further, the optical pickup 17 is adapted to receive the reflected light beam formed when the light beam is reflected by the optical disc, generates a light reception signal according to the light reception result, and supplies it to a signal processing unit 13.

The signal processing unit 13 performs predetermined calculation processing using the supplied light reception signal to generate a focus error signal and a tracking error signal, respectively, and supplies them to the drive control unit 12.

A servo-control part 12A of the drive control unit 12 generates a drive signal for driving the objective lens 18 based on the supplied focus error signal and tracking error signal, and supplies the signal to the biaxial actuator 19 of the optical pickup 17.

The biaxial actuator 19 of the optical pickup 17 is adapted to perform focus control and tracking control for the objective lens 18 based on the drive signal, and adjust focal position of the light beam collected by the objective lens 18.

Further, the drive control unit 12 is adapted to receive a notification of the target recording layer YT from the integrated control unit 11 and perform the focus control so that the light beam may be focused on the target recording layer YT.

The signal processing unit 13 is adapted to perform predetermined calculation processing, demodulation processing, decoding processing, etc. on the light reception signal, and thereby, reproduce information recorded in the optical disc 100.

Further, when information is recorded in the optical disc 100, the integrated control unit 11 receives information to be recorded from an external device (not shown) or the like, and supplies them to the signal processing unit 13. The signal processing unit 13 generates recording signals by performing predetermined coding processing, modulation processing, etc. on the information and supplies it to the optical pickup 17.

The optical pickup 17 makes the light beam to have intensity for recording and modulates the beam according to the recording signals, and thereby, forms recording marks according to the recording signals. For example, when the optical disc 100 employs the same recording system as that of a BD-RE (Blu-ray Disc-Rewritable), the recording marks are formed by locally phase-changing the material forming the recording layer.

As described above, the optical disc device 10 is adapted to perform reproduction processing and recording processing of information while applying the light beam from the optical pickup 17 to the optical disc 100 and performing the focus control and the tracking control based on the reflected light.

1-2. Configuration of Optical Pickup

As shown in FIG. 6, the optical pickup 17 is adapted to apply a light beam L1 to the optical disc 100 and receives a reflected light beam LR formed when the light beam L1 is reflected by the optical disc 100.

A laser diode 21 is adapted to output the light beam L1 of a blue-violet laser beam having a wavelength of about 405 [nm] as diverging light under the control of a light source control unit 31. Further, the attachment angle etc. of the laser diode 21 are adjusted so that the light beam L1 may be P-polarized light.

In practice, the integrated control unit 11 controls the light source control unit 31 to output the light beam L1 from the laser diode 21 and allow the beam to enter a collimator lens 22. The collimator lens 22 converts the light beam L1 from the diverging light into parallel light and allows the beam to enter a polarization beam splitter 23.

The polarization beam splitter 23 has a reflection-transmission surface 23S having varying transmittances according to the polarization direction of the light beam, and is adapted to transmit almost all P-polarized light beams and reflect almost all S-polarized light beams.

In practice, the polarization beam splitter 23 allows the almost all light beams L1 S to be transmitted through the reflection-transmission surface 23S and enter a spherical aberration correction unit 24.

The spherical aberration correction unit 24 is a liquid crystal element, for example, and adapted to change the spherical aberration of the light beam L1 and allows the beam to enter a quarter-wave plate 25. Further, the spherical aberration correction unit 24 is adapted to adjust the degree of the change of the spherical aberration due to a liquid crystal element by a spherical aberration control part 12A of the servo-control part 12A.

In practice, the spherical aberration correction unit 24 provides spherical aberration having a reverse characteristic to spherical aberration generated when the light beam L1 is collected and reaches the target recording layer YT of the optical disc 100 based on the control of the integrated control unit 11 and the spherical aberration control part 12AS in advance. Thereby, the spherical aberration correction unit 24 is adapted to correct the spherical aberration when the light beam L1 reaches the target recording layer YT.

The quarter-wave plate 25 is adapted to perform mutual conversion of the light beam between linearly-polarized light and circularly-polarized light, and converts the light beam L1 as P-polarized light into left-handed circularly-polarized light, for example, and allows the beam to enter the objective lens 18.

The objective lens 18 collects the light beam L1. Here, the integrated control unit 11 adjusts the position of the objective lens 18 with respect to the focus direction using a focus actuator 9F via a focus control part 12AF. Accordingly, the objective lens 18 applies the light beam L1 so that the focus F1 may be nearly on the target recording layer YT of the optical disc 100.

In this regard, the light beam L1 is reflected by the target recording layer YT to be the reflected light beam LR, and allowed to enter the objective lens 18. Further, the reflected light beam LR becomes right-handed circularly-polarized light because the rotational direction in the circularly-polarized light is reversed at reflection.

For example, when the recording layer Y0 is the target recording layer YT (FIG. 5A), the light beam L1 is reflected on the recording layer Y0 to be the reflected light beam LR.

Then, the reflected light beam LR is converted from the diverging light into parallel light by the objective lens 18, converted from the right-handed circularly-polarized light into S-polarized light (linearly-polarized light) by the quarter-wave plate 25, and further, allowed to enter the spherical aberration correction unit 24.

The spherical aberration correction unit 24 corrects the spherical aberration generated after the reflection of the reflected light beam LR by the target recording layer YT and before passing through the objective lens 18, and allows the reflected light beam LR to enter the polarization beam splitter 23.

The polarization beam splitter 23 reflects the reflected light beam LR as S-polarized light on the reflection-transmission surface 23S, and allows the beam to enter a collective lens 26. The collective lens 26 converts the reflected light beam LR into converging light, and allows the beam to enter a hologram element 27.

The hologram element 27 diffracts and separates the reflected light beam LR into at least zero-order rays and first-order rays because of the property as a diffractive element. The hologram element 27 allows the reflected light beam LR0 of zero-order rays to travel nearly straight, and allows the reflected light beam LR1 of the first-order rays to travel straight in a direction different from that of the zero-order rays and allows the beam to enter a cylindrical lens 28.

Regarding the reflected light beam LR (FIGS. 5A and 5B), when the focus F1 of the light beam L1 shifts toward the inner circumference side or the outer circumference side with respect to the desired track in the optical disc 100, the amounts of light in the shaded parts in FIG. 1 vary due to the diffraction action by the groove structure of the track. The shaded parts are also called push-pull areas and the components of the amounts of light corresponding to the shaded parts are also called push-pull components.

It is known that the amounts of light of the push-pull components change according to the amount of shift when the focus F1 of the light beam L1 shifts from the desired track. Accordingly, the optical disc device 10 is adapted to perform tracking control of the objective lens 18 by detecting the push-pull components.

Figure 7A:
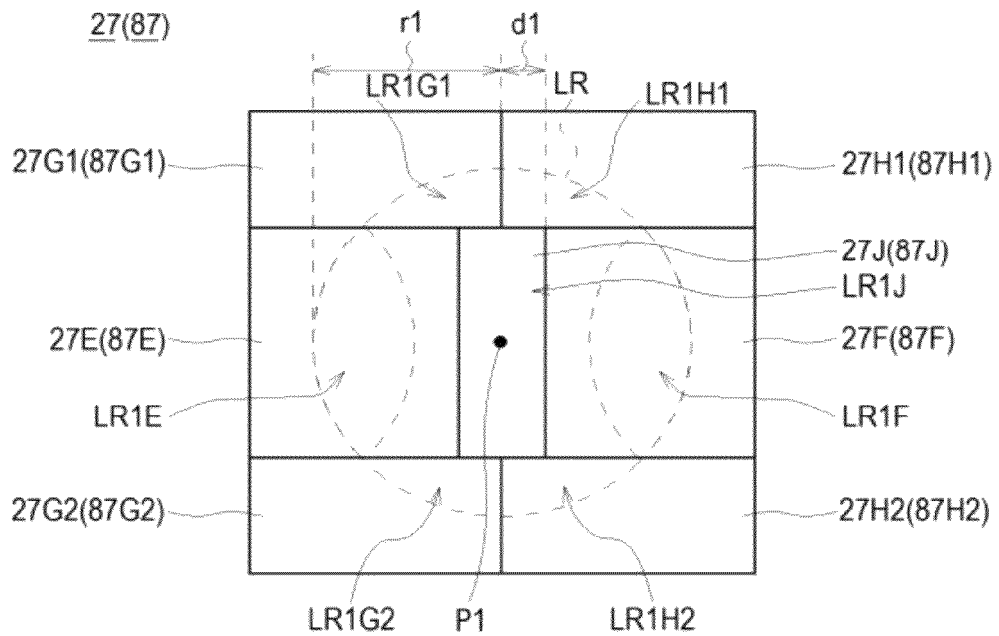
FIGS. 7A and 7B are schematic diagrams showing a configuration of a hologram element.
Figure 7B:
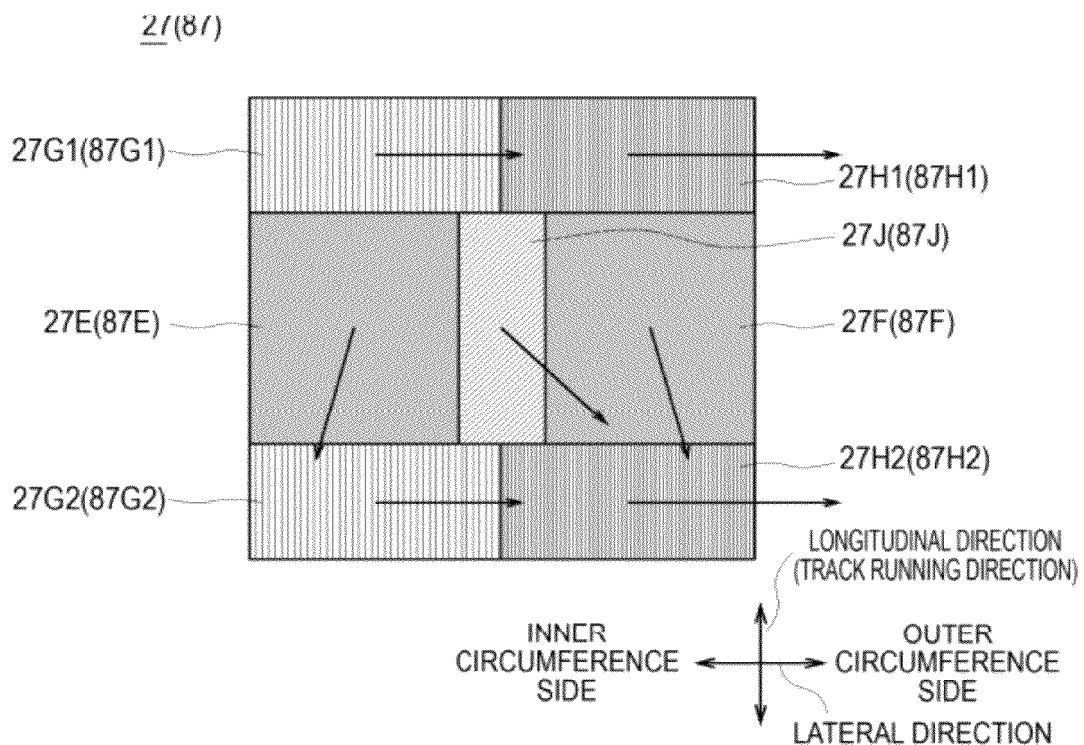

The hologram element 27 has the part through which the reflected light beam LR passes divided into plural areas 27E to 27J corresponding to the push-pull areas as shown in FIG. 7A, and the diffraction directions of the reflected light beam LR are set with respect to each area as shown in FIG. 7B.

The area 27E turns the part containing many first-order diffracted rays (i.e., +1-order rays and −1-order rays) diffracted by the groove structure of the tracks in the optical disc 100 of the reflected light beam LR1 and corresponding to the inner circumference side of the optical disc 100 into reflected light beam LR1E. In this regard, the area 27E diffracts the reflected light beam LR1E in the direction tilted toward the inner circumference side (toward the left of the drawing) from the direction nearly along the running direction of the tracks (for convenience, this direction is referred to as "longitudinal direction" as below).

The area 27F turns the part containing many first-order diffracted rays (i.e., +1-order rays and −1-order rays) diffracted by the groove structure of the tracks in the optical disc 100 of the reflected light beam LR1 and corresponding to the outer circumference side of the optical disc 100 into reflected light beam LR1F. In this regard, the area 27F diffracts the reflected light beam LR1F in the direction tilted toward the outer circumference side (toward the right of the drawing) from the longitudinal direction.

Here, the traveling direction of the reflected light beam LR1F is nearly symmetric to the traveling direction of the reflected light beam LR1E with respect to the lateral direction orthogonal to the longitudinal direction. In other words, the reflected light beams LR1E and LR1F respectively travel nearly in the same direction with respect to the longitudinal direction and in the opposite directions with respect to the lateral direction.

The areas 27G1 and 27G2 turn the part hardly containing the first-order diffracted rays diffracted by the tracks in the optical disc 100 in the reflected light beam LR1 but corresponding to the inner circumference side of the optical disc 100 of the areas except the center part of the reflected light beam LR1 into reflected light beams LR1G1 and LR1G2. In this regard, the areas 27G1 and 27G2 (hereinafter, these are collectively referred to as "area 27G") diffract the reflected light beams LR1G1 and LR1G2 (hereinafter, these are collectively referred to as "reflected light beam LR1G") nearly in the lateral direction toward the outer circumference side (toward the right of the drawing).

The areas 27H1 and 27H2 turn the part hardly containing the first-order diffracted rays diffracted by the tracks in the optical disc 100 in the reflected light beam LR1, but corresponding to the outer circumference side of the optical disc 100 of the areas except the center part of the reflected light beam LR1 into reflected light beams LR1H1 and LR1H2. In this regard, the areas 27H1 and 27H2 (hereinafter, these are collectively referred to as "area 27H") diffract the reflected light beams LR1H1 and LR1H2 (hereinafter, these are collectively referred to as "reflected light beam LR1H") nearly in the lateral direction toward the outer circumference side slightly largely than the reflected light beam LR1G.

The area 27J turns the center part of the reflected light beam LR1 into reflected light beam LR1J. In this regard, the area 27J diffracts the reflected light beam LR1J in an oblique direction nearly intermediate between the longitudinal direction and the lateral direction, i.e., toward the lower right of the drawing.

In this way, the hologram element 27 turns the parts containing the push-pull components of the reflected light beam LR1 of the first-order rays into the reflected light beams LR1E and LR1F, and diffracts the beams toward the inner circumference side and the outer circumference side in the longitudinal direction, respectively.

Further, the hologram element 27 turns the parts hardly containing the push-pull components in the reflected light beam LR1 at the upstream and the downstream of the traveling direction of the tracks into the reflected light beams LR1G and LR1H and respectively diffracts the beams in the lateral direction.

Incidentally, the hologram element 27 has so-called binary holograms in the respective areas 27E to 27J, and thus, in practice, +1-order rays and −1-order rays are generated by the diffraction action. However, the optical pickup 17 is adapted to use only one of the +1-order ray and −1-order ray as the first-order diffracted ray, not to use the other.

As described above, the hologram element 27 is adapted to diffract the reflected light beam LR1 in directions set with respect to each area and divide the beam into plural reflected light beams LR1E to LR1J separately from one another.

The cylindrical lens 28 provides astigmatism to the reflected light beam LR0 of zero-order rays and applies the beam to the photodetector 29.

Incidentally, the cylindrical lens 28 similarly provides astigmatism to the reflected light beams LR1E, LR1F, LR1G, LR1H, and LR1J of first-order rays because of its optical property. However, the reflected light beams LR1E to LR1J are adapted to be provided with aberration that cancels the astigmatism in advance by the diffraction grating formed on the hologram element 27, and thereby, the beams hardly have aberration when output from the cylindrical lens 28.

Figure 8:
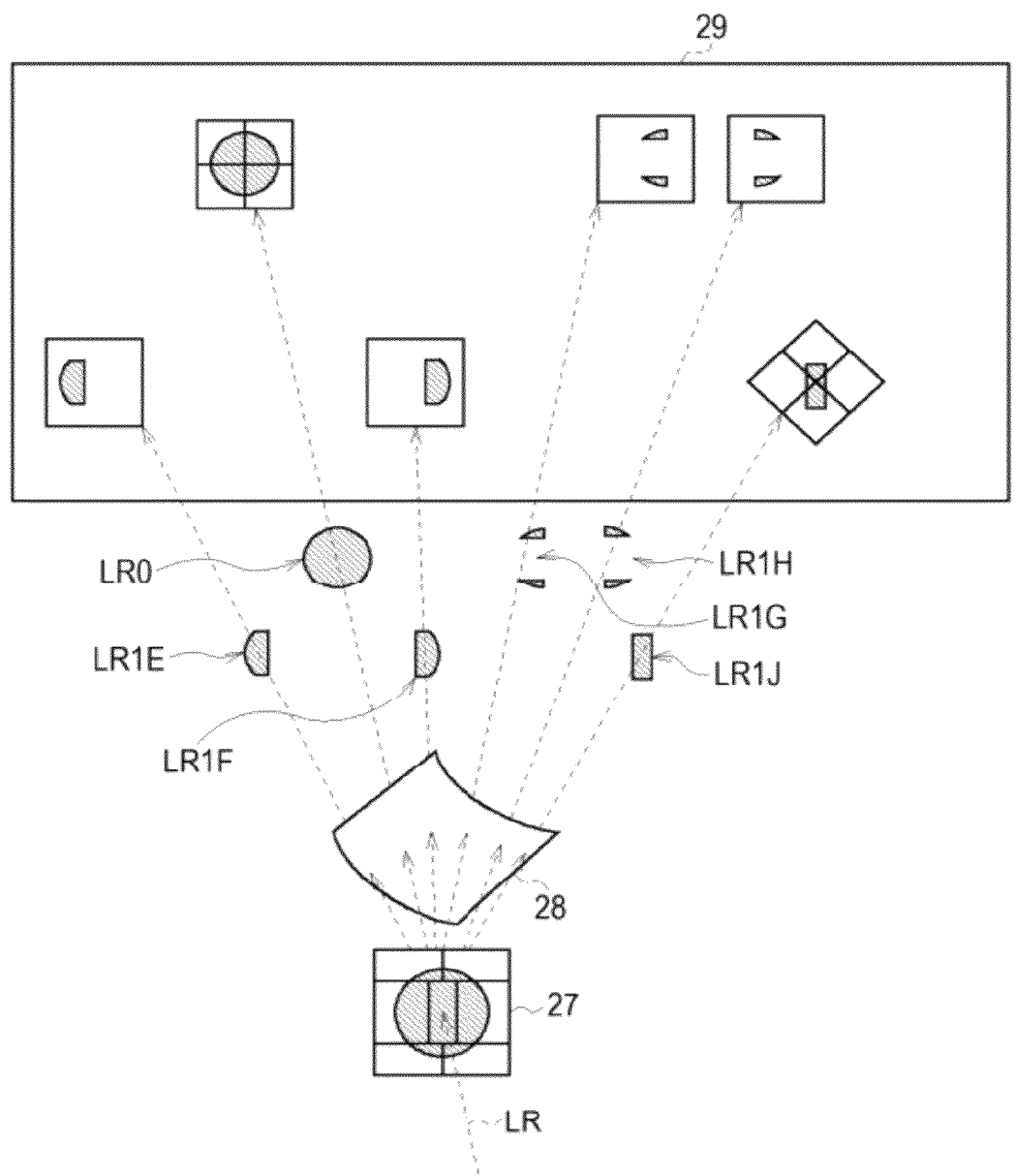
FIG. 8 is a schematic diagram showing a state of separation of the reflected light beam according to the first embodiment.

Here, FIG. 8 schematically shows a state in which reflected light beam LR is divided by the hologram element 27 and applied to the photodetector 29.

Figure 9:
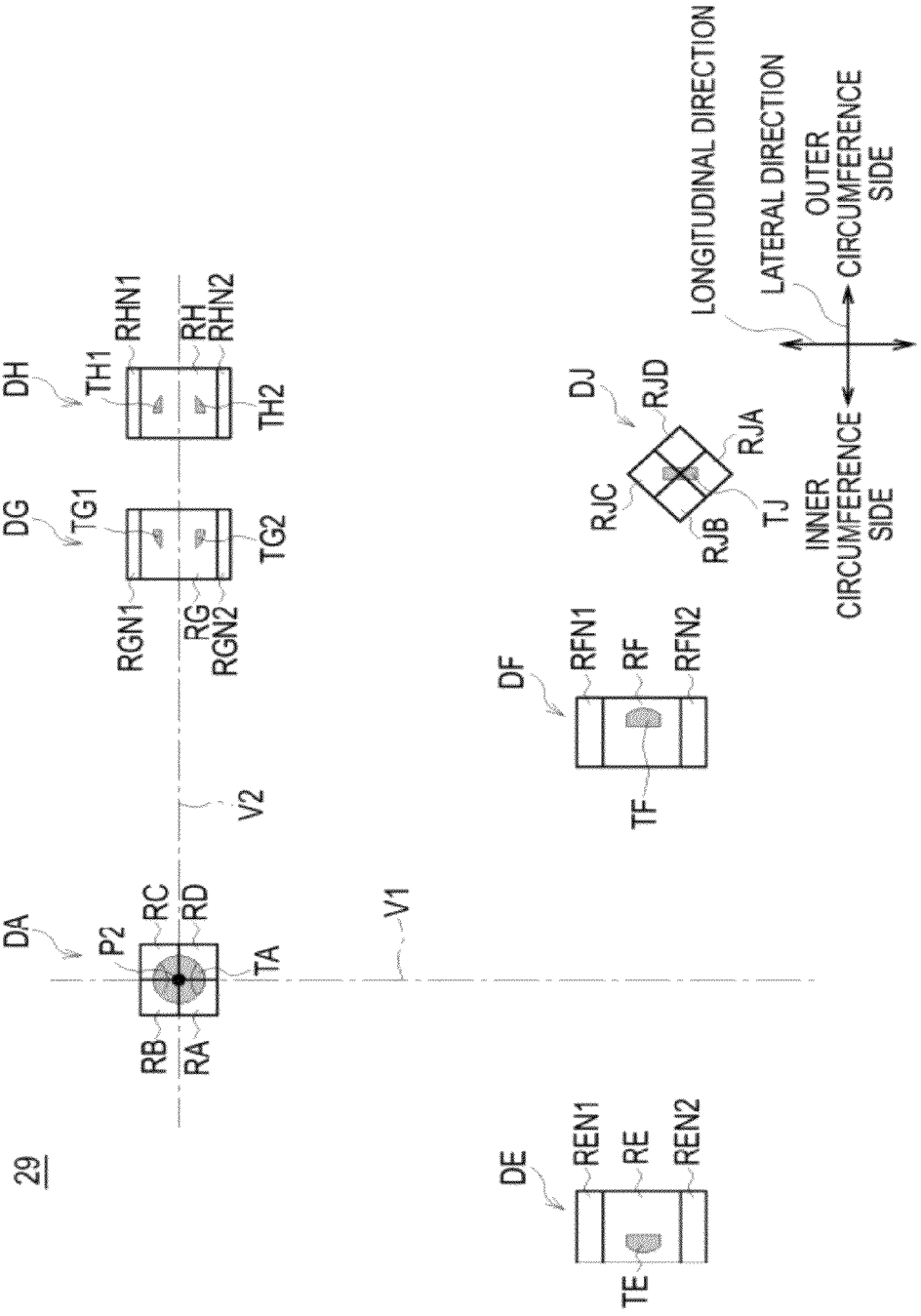
FIG. 9 is a schematic diagram showing a configuration of a photodetector according to the first embodiment.

As shown in FIG. 9, in the photodetector 29, plural light receiving parts DA, DE, DF, DG, DH, and DJ are formed, and plural light receiving areas are formed in the respective light receiving parts.

The light receiving part DA includes light receiving areas RA, RB, RC, and RD divided into two in the longitudinal direction and the lateral direction, respectively, i.e., divided into four in a grid pattern with the reference point P2 corresponding to the optical axis of the reflected light beam LR0 of zero-order rays as the center. All of the light receiving areas RA to RD are formed substantially in square shapes nearly having the same size.

The light receiving areas RA, RB, RC, and RD are adapted to receive parts of a spot TA formed by the reflected light beam LR0, respectively, generate light reception signals SA, SB, SC, and SD according to the amounts of received light, respectively, and send out the signals to a head amplifier 32 (FIG. 6).

The light receiving part DE is formed in a rectangular shape longer in the longitudinal direction as a whole, and divided into three in the longitudinal direction. The center part of the light receiving part DE is a light receiving area RE substantially in a square shape, and opposed end parts thereof are stray light receiving areas REN1 and REN2 shorter in the longitudinal direction, respectively.

That is, in the light receiving part DE, the light receiving area RE is provided at the center and the stray light receiving areas REN1 and REN2 are provided adjacent to the light receiving area RE over the nearly equal range to the light receiving area RE with respect to the lateral direction.

The light receiving area RE is adapted to receive a spot TE formed by the reflected light beam LR1E, and generate a light reception signal SE according to the amount of received light thereof and send out the signal to the head amplifier 32 (FIG. 6). Further, the stray light receiving areas REN1 and REN2 are adapted to generate a light reception signal SEN corresponding to the summed value of the respective amounts of received light and send out the signal to the head amplifier 32.

The light receiving part DF is provided in a location nearly symmetric to the light receiving part DE with a virtual straight line V1 extended through the reference point P2 in the longitudinal direction as an axis of symmetry. Further, the light receiving part DF has the same shape as that of the light receiving part DE, and includes a light receiving area RF and stray light receiving areas RFN1 and RFN2 respectively corresponding to the light receiving area RE and the stray light receiving areas REN1 and RFN2.

The light receiving area RF is adapted to receive a spot TF formed by the reflected light beam LR1F, and generate a light reception signal SF according to the amount of received light thereof and send out the signal to the head amplifier 32 (FIG. 6). Further, the stray light receiving areas RFN1 and RFN2 are adapted to generate a light reception signal SEN corresponding to the summed value of the respective amounts of received light and send out the signal to the head amplifier 32.

The light receiving part DG is provided on a virtual straight line V2 extended through the reference point P2 in the lateral direction. The light receiving part DG is formed in a rectangular shape longer in the longitudinal direction as a whole and divided into three in the longitudinal direction like the light receiving part DE. The center part of the light receiving part DG is a light receiving area RG substantially in a square shape, and opposed end parts thereof are stray light receiving areas RGN1 and RGN2 shorter in the longitudinal direction, respectively.

That is, in the light receiving part DG, like in the light receiving part DE, the light receiving area RG is provided at the center and the stray light receiving areas RGN1 and RGN2 are provided respectively adjacent to the light receiving area RG in the longitudinal direction.

The light receiving area RG is adapted to receive spots TG1 and TG2 formed by the reflected light beams LR1G1 and LR1G2, and generate light reception signals SG according to the amounts of received light thereof and send out the signals to the head amplifier 32 (FIG. 6). Further, the stray light receiving areas RGN1 and RGN2 are adapted to generate a light reception signal SGN corresponding to the summed value of the respective amounts of received light and send out the signal to the head amplifier 32.

The light receiving part DH is provided farther than the light receiving part DG seen from the reference point P2 slightly separately from the light receiving part DG. Further, the light receiving part DH has the same shape as that of the light receiving part DG, and includes a light receiving area RH and stray light receiving areas RHN1 and RHN2 respectively corresponding to the light receiving area RG and the stray light receiving areas RGN1 and RGN2.

The light receiving area RH is adapted to receive spots TH1 and TH2 formed by the reflected light beams LR1H1 and LR1H2, and generate light reception signals SH according to the amounts of received light thereof and send out the signals to the head amplifier 32 (FIG. 6). Further, the stray light receiving areas RHN1 and RHN2 are adapted to generate a light reception signal SHN corresponding to the summed value of the respective amounts of received light and send out the signal to the head amplifier 32.

The light receiving part DJ is provided in a location separated from the reference point P2 and also slightly separated from the light receiving part DF in the oblique direction from the reference point P2 (i.e., nearly intermediate between the longitudinal direction and the lateral direction).

The light receiving part DJ is adapted to receive the received light beam LR1J by light receiving areas RJA, RJB, RJC, and RJD divided into four in a grid pattern. Here, the division directions of the respective light receiving areas in the light receiving part DJ form angles of about 45 degrees with the division direction in the light receiving part DA.

Further, all of the light receiving areas RJA to RJD are formed substantially in square shapes nearly having the same size.

The light receiving areas RJA, RJB, RJC, and RJD are adapted to generate light reception signals SJA, SJB, SJC, and SJD according to the amounts of received light, respectively, and send out the signals to the head amplifier 32 (FIG. 6).

As described above, the photodetector 29 is adapted to generate light reception signals S according to the amounts of received light by the respective light receiving areas R of the light receiving parts DA and DE to DJ, respectively, and send out the signals to the head amplifier 32.

Incidentally, in the optical pickup 17, by the design of the collective lens 26, hologram element 27, and the like, the reflected light beams LR0, LR1E to LR1J are respectively focused on locations near the application surface of the photodetector 29.

1-3. Application of Stray Light and Arrangement of Light Receiving Parts

The optical disc 100 (FIGS. 5A and 5B) is adapted to constantly reflect the light beam L at predetermined transmittances in the recording layers Y1 to Y3 and transmit the rest, and reflect the light beam L1 transmitted through the recording layer Y1 in the recording layer Y0.

Accordingly, the light beam L1 is constantly reflected respectively by the recording layers Y1 to Y3 as well even when the recording layer Y0, for example, is selected as the target recording layer YT by the optical disc device 10. In this way, the light beam formed when parts of the light beam L1 are reflected by the other recording layers Y1 to Y3 is called an interlayer stray light beam LN.

The interlayer stray light beam LN travels in the same optical path as that of the reflected light beam LR, is diffracted by the hologram element 27, and is finally applied to the photodetector 29.

However, the interlayer stray light beam LN is different from the reflected light beam LR in the optical path length from the exit from the objective lens 18 as the light beam L1 to the entrance into the objective lens 18 again. Accordingly, the interlayer stray light beam LN is different from the reflected light beam LR in the convergence state (divergence state) at the entrance into the objective lens 18.

On the other hand, in the optical pickup 17, regarding the reflected light beam LR, arrangement, optical properties, etc. of various optical components are determined so that the photodetector 29 may be a confocal point of the target recording layer YT.

For the purpose, the interlayer stray light beam LN is applied to the photodetector 29 in a condition that the beam is divided into the same division pattern as that of the reflected light beam LR by the hologram element 27 and out of focus, in a so-called defocus condition.

Further, the optical disc 100 has plural other recording layers Y (three layers in this case). Accordingly, the interlayer stray light beam. LN is different from the reflected light beam LR in the optical path length difference and different in the defocus condition when applied onto the photodetector 29 according to the recording layer Y (i.e., the recording layers Y1 to Y3) by which the beam has been reflected.

That is, in the photodetector 29, the application pattern of the interlayer stray light beam LN (hereinafter, referred to as "stray light pattern W") varies depending on the layer distance between the recording layer Y in which the interlayer stray light beam LN has been generated and the target recording layer YT.

As below, the states in which the stray light pattern W is applied will be explained with respect to the cases where the layer distance between the target recording layer YT and the recording layer Y in which the interlayer stray light beam LN has been generated is large and small.

[1-3-1. Case of Large Layer Distance]

Here, first, the case where the deepest recording layer Y0 in the optical disc 100 is selected as the target recording layer YT and the focus F1 of the light beam L1 is focused on the recording layer Y0 (FIG. 5A) is assumed.

Figure 10:
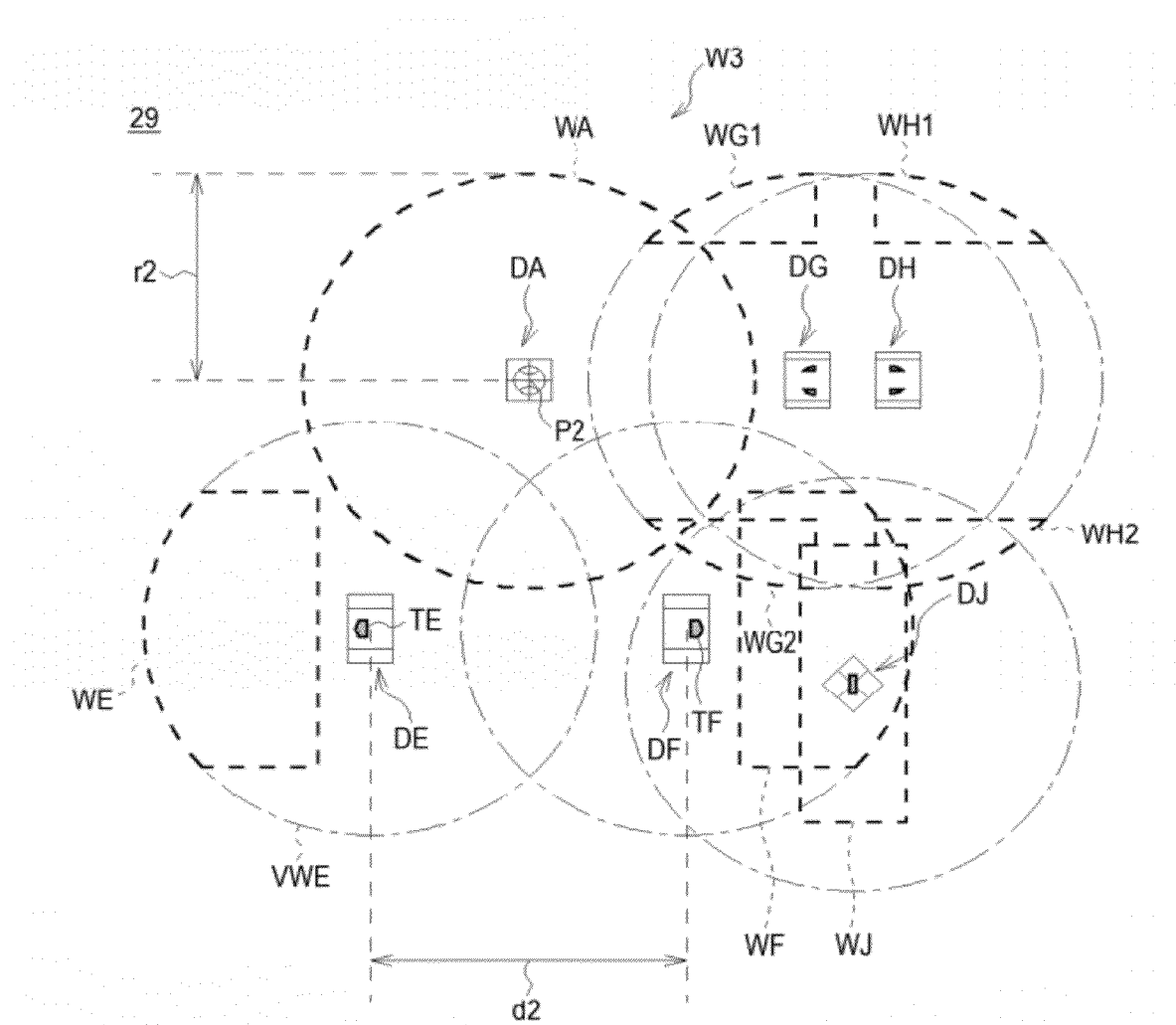
FIG. 10 is a schematic diagram for explanation of formation of a stray light pattern (1).

In this case, the interlayer stray light beam LN formed when the light beam L1 is reflected by the shallowest recording layer Y3 (hereinafter, referred to as "interlayer stray light beam LN3") forms a group of stray light patterns W3 as shown in FIG. 10 on the photodetector 29.

In the group of stray light patterns W3, a stray light pattern WA of zero-order rays is formed by the hologram element 27. Further, in the group of stray light patterns W3, stray light patterns WE, WF, WG1, WG2, WH1, and WH2 of first-order rays are formed by the areas 27E, 27F, 27G1, 27G2, 27H1, and 27H2 of the hologram element 27, respectively.

The stray light pattern WE is a part corresponding to the area 27E of the hologram element 27 of a virtual stray light pattern VWE having the equal radius as that of the stray light pattern WA and centered around the application position of the spot TE (shown by dashed dotted lines in the drawing). The other stray light patterns WF, WG1, WG2, WH1, and WH2 have similar configurations.

Here, the recording layer Y3 (FIG. 5A) is a recording layer Y most apart from the recording layer Y0 as the target recording layer YT. That is, regarding the optical path length differences between the interlayer stray light beam LN by the respective recording layers Y and the reflected light beam LR, the optical path length difference with respect to the interlayer stray light beam LN3 is the longest.

Accordingly, the group of stray light patterns W3 is the most expanded one of the groups of stray light patterns respectively formed by the respective interlayer stray light beams LN.

Therefore, the light receiving parts DE, DF, DG, and DH of the photodetector 29 are defined in sizes, arrangement, etc. so as not to overlap with the stray light patterns WA, WE, WF, WG1, WG2, WH1, or WH2 with respect to the group of stray light patterns W3.

Figure 5A:
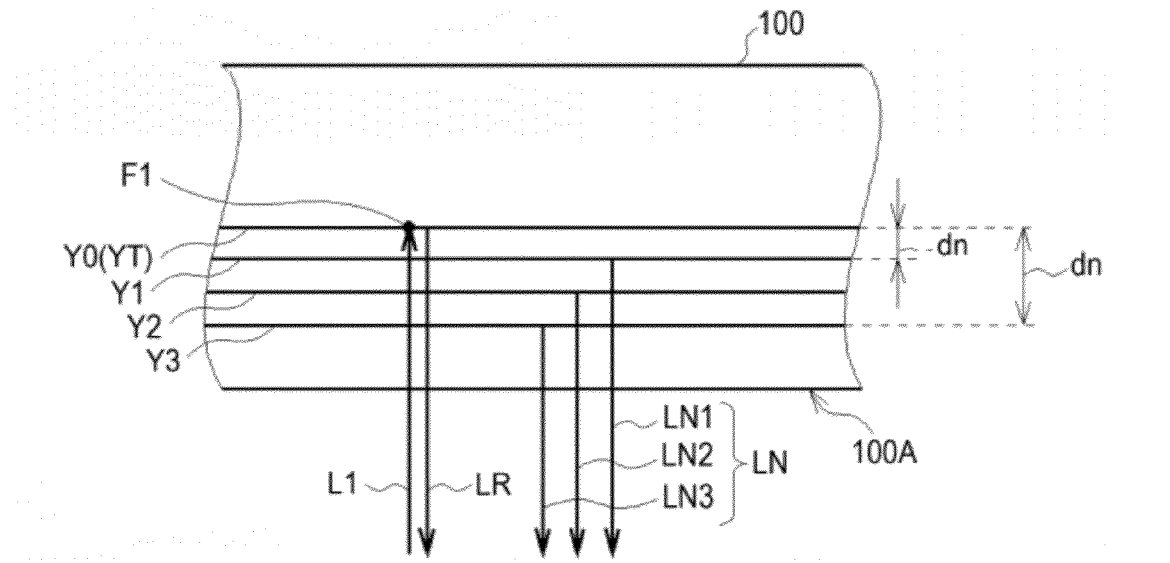
FIGS. 5A and 5B are schematic diagrams for explanation of generation of reflected light beams and interlayer stray light beams in an optical disc.
Figure 5B:
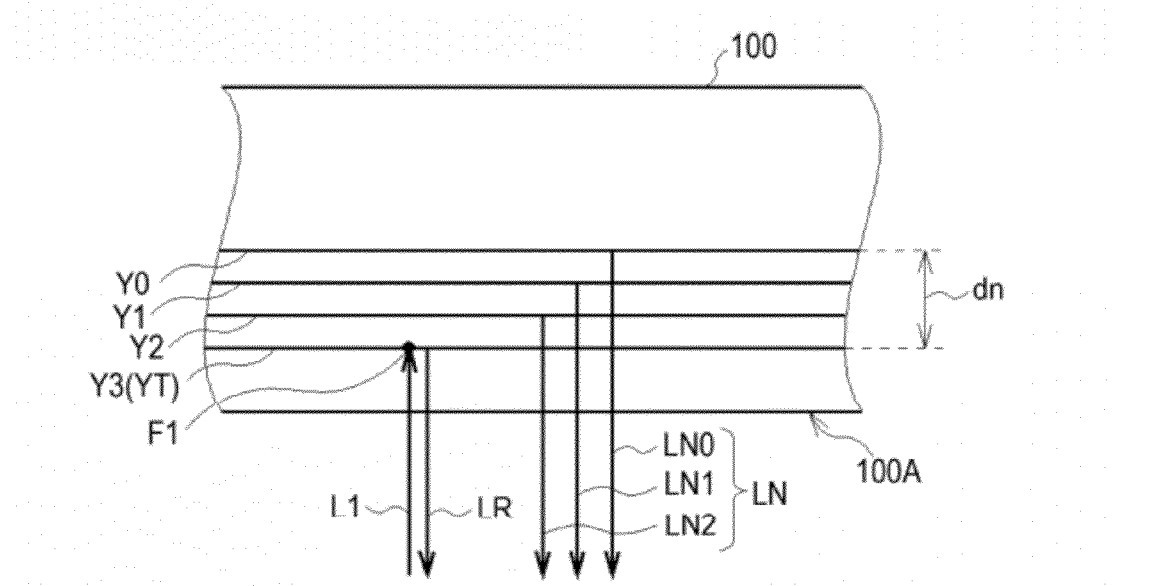

Next, the case where the shallowest recording layer Y3 in the optical disc 100 is selected as the target recording layer YT and the focus F1 of the light beam L1 is focused on the recording layer Y3 is assumed as shown in FIG. 5B corresponding to FIG. 5A.

Figure 11:
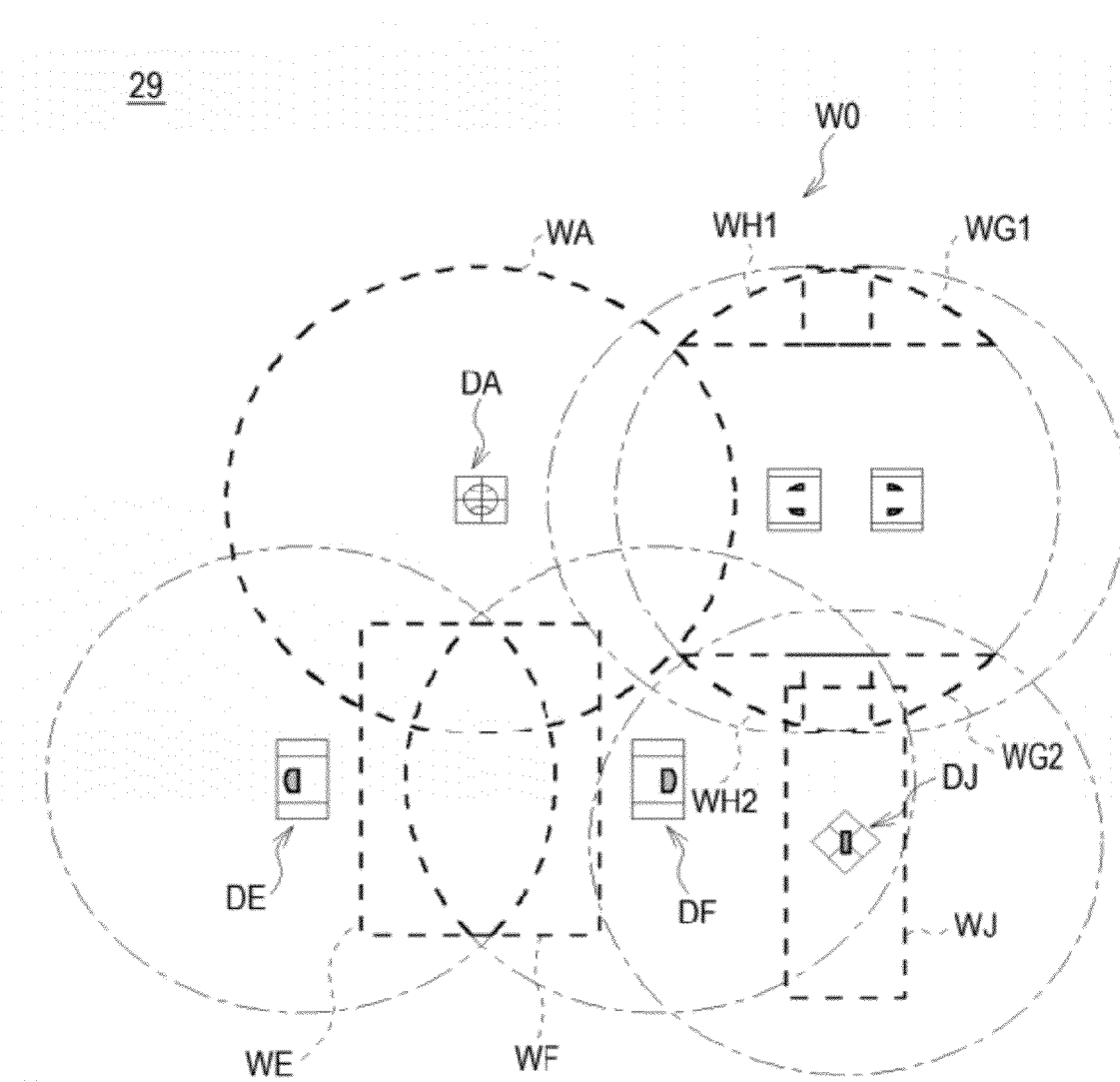
FIG. 11 is a schematic diagram for explanation of formation of a stray light pattern (2).

In this case, the interlayer stray light beam LN formed when the light beam L1 is reflected by the deepest recording layer Y0 (hereinafter, referred to as "interlayer stray light beam LN0") forms a group of stray light patterns W0 as shown in FIG. 11 corresponding to FIG. 10 on the photodetector 29.

In the group of stray light patterns W0, as is the case of the group of stray light patterns W3, a stray light pattern WA of zero-order rays is formed by the hologram element 27. Further, in the group of stray light patterns W0, stray light patterns WE, WF, WG1, WG2, WH1, and WH2 of first-order rays are formed by the areas 27E, 27F, 27G1, 27G2, 27H1, and 27H2 of the hologram element 27, respectively.

In this regard, the optical path length of the interlayer stray light beam LN0 is extended longer than the optical path length of the reflected light beam LR. Accordingly, when the interlayer stray light beam LN0 is collected by the collective lens 26, the beam is once focused in a location shallower than that of the reflected light beam LR, that is, before reaching the photodetector 29, and then, becomes diverging light. Here, the image of the interlayer stray light beam LN0 (i.e., the sectional shape) is rotated by 180 degrees around the optical axis.

On this account, for example, the stray light pattern WE in the group of stray light patterns W0 (FIG. 11) is formed to be rotated by 180 degrees around the application position of the spot TE compared to the stray light pattern WE in the group of stray light patterns W3 (FIG. 10). The other stray light patterns WF, WG1, WG2, WH1, and WH2 have similar configurations.

Regarding the group of stray light patterns W3 and group of stray light patterns W0, since the stray light pattern WA has a circular shape and the stray light pattern WJ has a rectangular shape, they have the same shapes even after rotation by 180 degrees.

As described above, the group of stray light patterns W0 (FIG. 11) is different from the group of stray light patterns W3 (FIG. 10) in the positions and directions in which the stray light patterns WE, WF, WG1, WG2, WH1, and WH2 are formed.

That is, regarding the interlayer stray light beams LN, even when the optical path length differences from the reflected light beam LR are equal, the shapes of the stray light patterns formed when the beams are applied onto the photodetector 29 vary depending on whether the optical path lengths are extended longer or shortened shorter than that of the reflected light beam LR.

Accordingly, the light receiving parts DE, DF, DG, and DH of the photodetector 29 are arranged so as not to overlap with the stray light patterns WA, WE, WF, WG1, WG2, WH1, or WH2 with respect to the group of stray light patterns W0 in addition to the group of stray light patterns W3.

Here, specific avoidance conditions for the light receiving parts DE and DF to avoid the stray light patterns WE and WF in the photodetector 29 will be considered.

First, a distance between the boundary line between the areas 27H1 and 27H2 and the boundary line between the areas 27F and 27J is d1 and the radius of the reflected light beam LR is r1 in the hologram element 27 (FIG. 7A). Further, the distance between the light receiving parts DE and DF (i.e., the distance between the light receiving areas RE and RF or the distance between the spots TE and TF) is d2 in the photodetector 29 (FIG. 10), and the radius of the stray light pattern WA is r2.

Then, it is assumed that the radius r1 of the reflected light beam LR in the hologram element 27 and the radius r2 of the stray light pattern WA in the photodetector 29 is equal. The avoidance condition in this regard is "the distance d2 is larger than the summed value of the radius r1 and the distance d1".

In practice, the radius r1 and the radius r2 are different from each other due to the optical design of the optical pickup 17 or the like. Accordingly, if the ratio between the radius r1 and the radius r2 is reflected in the above described avoidance condition, they can be expressed by the following expression (1).

$$\frac{d2}{r2} \geq \frac{r1 + d1}{r1} \qquad (1)$$

By transforming the expression (1), the following expression (2) is obtained.

$$d2 \geq r2 \times \left(1 + \frac{d1}{r1}\right) \qquad (2)$$

Therefore, the photodetector 29 is designed to satisfy the expression (2) with respect to the distance d2 between the light receiving parts DE and DF.

[1-3-2. Case of Small Layer Distance]

Next, the case where the recording layer Y0 in the optical disc 100 is selected as the target recording layer YT again and the focus F1 of the light beam L1 is focused on the recording layer Y0 (FIG. 5A) is assumed.

In this case, the interlayer stray light beam LN formed when the light beam L1 is reflected by the recording layer Y1 having a small layer distance (hereinafter, referred to as "interlayer stray light beam LN1") forms a group of stray light patterns W1 as shown in FIG. 10 corresponding to FIG. 12 on the photodetector 29.

In the group of stray light patterns W1, as is the case of the group of stray light patterns W3, a stray light pattern WA of zero-order rays is formed by the hologram element 27. Further, in the group of stray light patterns W1, stray light patterns WE, WF, WG1, WG2, WH1, and WH2 of first-order rays are formed by the areas 27E, 27F, 27G1, 27G2, 27H1, and 27H2 of the hologram element 27, respectively.

Here, the optical path length difference between the interlayer stray light beam LN1 reflected by the recording layer Y1 of the optical disc 100 and the reflected light beam LR is shorter than the optical path length difference between the interlayer stray light beam LN3 reflected by the recording layer Y3 and the reflected light beam LR.

Therefore, the respective stray light patterns W in the group of stray light patterns W1 have shapes formed by contracting the respective stray light patterns W in the group of stray light patterns W3 (FIG. 10) around the corresponding spots T.

Accordingly, the stray light patterns WE, WF, WG1, WG2, WH1, and WH2 of the group of stray light patterns W1 are respectively close to the light receiving parts DE, DF, DG, and DH.

Here, the recording layer Y1 (FIG. 5A) is a recording layer Y closest to the recording layer Y0 as the target recording layer YT. That is, regarding the optical path length differences between the interlayer stray light beam LN by the respective recording layers Y and the reflected light beam LR, the optical path length difference with respect to the interlayer stray light beam LN1 is the shortest.

Accordingly, the group of stray light patterns W1 is the most contracted one of the groups of stray light patterns respectively formed by the respective interlayer stray light beams LN.

Therefore, the light receiving parts DE, DF, DG, and DH of the photodetector 29 are defined in sizes, arrangement, etc. so as not to overlap with the stray light patterns WA, WE, WF, WG1, WG2, WH1, or WH2 with respect to the group of stray light patterns W1 as well.

As described above, in the photodetector 29, the light receiving parts DE, DF, DG, and DH are defined in sizes, arrangement, etc. so as not to overlap with the respective stray light patterns in the respective groups of stray light patterns W.

[1-3-3. Influence of Stray Light Due to Tracks of Other Recording Layers]

In the optical disc 100 (FIGS. 5A and 5B), as described above, parts of the light beam L1 are reflected by the other recording layers Y other than the target recording layer YT and form the interlayer stray light beam LN.

In addition, in the optical disc 100, parts of the light beam L1 are reflected and diffracted due to the groove structure of the tracks formed in the other recording layers Y, and thereby, another layer diffraction interlayer stray light beam LM including +1-order and −1-order diffracted rays is generated.

Figure 13:
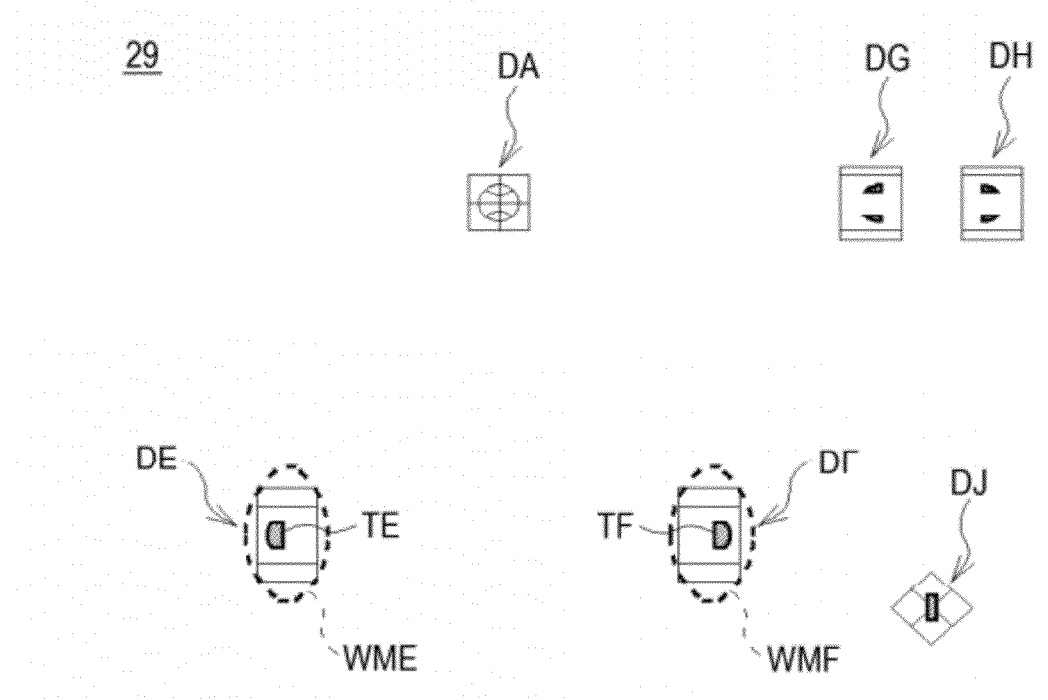
FIG. 13 is a schematic diagram for explanation of formation of a stray light pattern diffracted by other layers.

When the other layer diffraction interlayer stray light beam LM reaches the photodetector 29, as shown in FIG. 13, other layer diffraction interlayer stray light patterns WME and WMF having substantially oval shapes or lemon shapes with the application positions of the spots TE and TF as the centers, respectively are formed.

Here, in the photodetector 29, the light receiving parts DE and DF are provided at some distance apart as described above. Accordingly, in the photodetector 29, the other layer diffraction interlayer stray light pattern WME centered on the application position of the spot TE overlaps with the detection area RE but does not overlap with the detection area RF. Contrary, the other layer diffraction interlayer stray light pattern WMF centered on the application position of the spot TF overlaps with the detection area RF but does not overlap with the detection area RE.

As described above, in the photodetector 29, the other layer diffraction interlayer stray light pattern WME and the other layer diffraction interlayer stray light pattern WMF due to the other layer diffraction interlayer stray light beam LM can be separated from each other, and thereby, the other layer diffraction interlayer stray light patterns WME and WMF do not overlap.

1-4. Focus Control and Tracking Control

The head amplifier 32 (FIG. 6) of the optical disc device 10 respectively amplifies the light reception signals SA, SB, SC, and SD, SE, and SF, SG, and SH, and SJA, SJB, SJC, and SJD, and supplies the signals to the signal processing unit 13.

Further, the head amplifier 32 is adapted to also respectively amplify the stray light reception signals SEN, SFN, SGN, and SHN, and supplies the signals to the signal processing unit 13.

The signal processing unit 13 performs calculation according to the following expression (3) using a focus error signal calculation circuit 13F, and thereby, calculates a focus error signal SFE according to the astigmatic method and supplies the signal to the focus control part 12AF of the servo-control part 12A.

$$SFE=(SA+SC)-(SB+SD) \qquad (3)$$

The focus error signal SFE represents an amount of shift between the focus F1 of the light beam L1 and the target recording layer YT in the optical disc 100.

The focus control part 12AF of the servo-control part 12A (FIG. 6) generates a focus drive signal SFD based on the focus error signal SFE and supplies the signal to a focus actuator 19F. The focus actuator 19F performs so-called focus control of driving the objective lens 18 in the focus direction based on the focus drive signal SFD.

The optical disc device 10 repeatedly performs the focus control (that is, performs feedback control), and thereby, converges the amount of shift between the focus F1 of the light beam L1 and the target recording layer YT with respect to the focus direction to an arbitrary target value.

Further, the signal processing unit 13 is adapted to use the one-beam push-pull method for generation of a tracking error signal representing an amount of shift between the focus F1 of the light beam L1 and a desired track in the target recording layer YT. In the one-beam push-pull method, basically, the difference value between the push-pull components shown by the shaded part in FIG. 1 of the reflected light beam LR is calculated.

In the optical disc device 10, the focus F1 of the light beam L1 collected by the objective lens 18 is arranged to follow the desired track of the optical disc 100. Here, when the track is eccentric or the like, the optical disc device 10 performs so-called lens shift of moving the objective lens 18 of the optical pickup 17 in the radial direction so that the focal point F1 may follow the track.

When the lens shift occurs, in the spots TE and TF (FIG. 9) corresponding to the shaded parts in FIG. 1, the amounts of light change due to the lens shift.

The signal processing unit 13 can calculate a tracking error signal STE1 by performing calculation according to the following expression (4) using a tracking error signal calculation circuit 13T for addressing the lens shift.

$$STE1 = (SF-SE) - Kt \times (SH-SG) \quad (4)$$

In the expression (4), the first term contains the push-pull component and the lens-shift component and the second term contains only the lens-shift component. The coefficient Kt is a coefficient appropriately determined so that the lens shift component contained in the first term may be cancelled when the lens shift occurs in the optical pickup 17.

Figure 12:
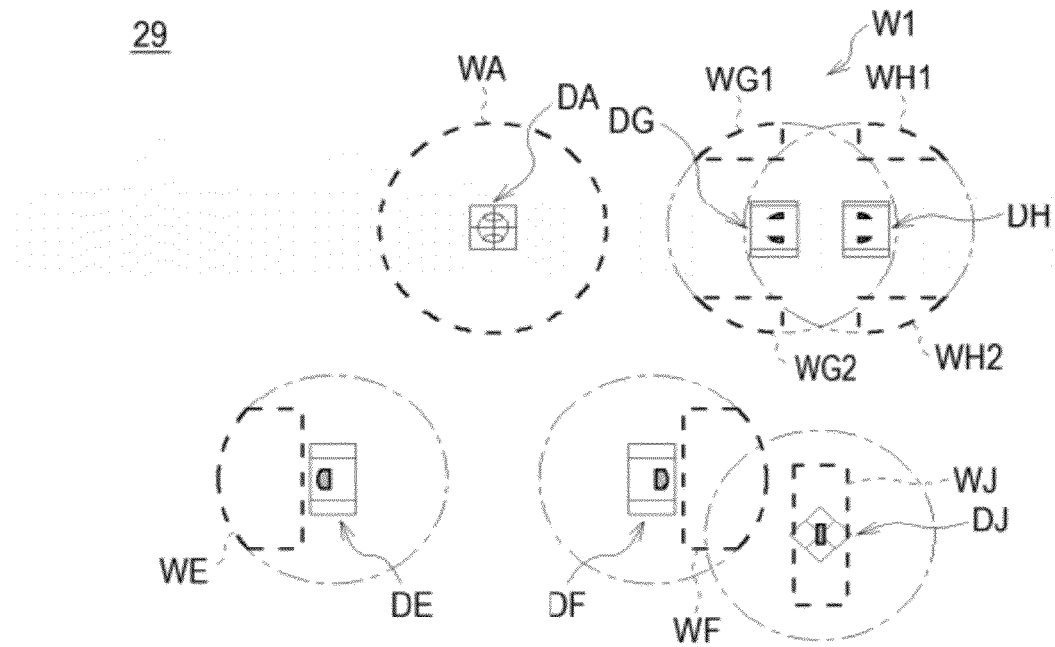
FIG. 12 is a schematic diagram for explanation of formation of a stray light pattern (3).
Figure 15:
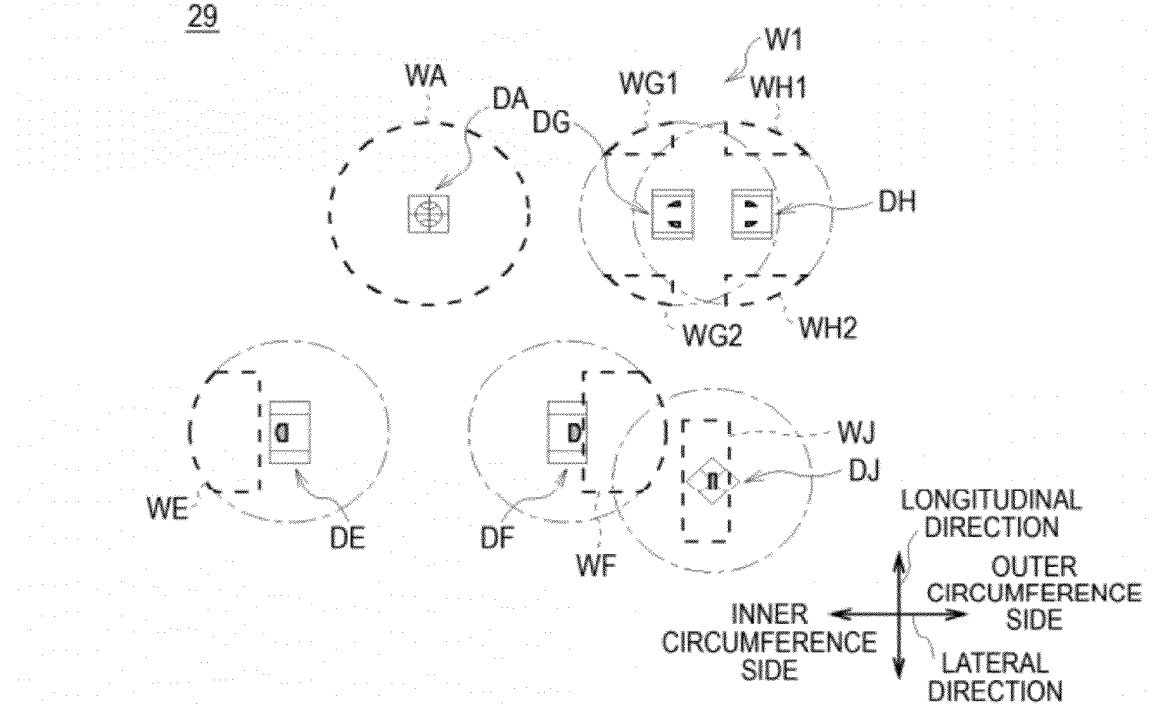
FIG. 15 is a schematic diagram for explanation of formation of a stray light pattern (4).

In the case where the lens shift of the objective lens 18 occurs, regarding the group of stray light patterns W1 formed in the photodetector 29, for example, the stray light pattern WF may be extended toward the inner circumference side and overlap with the detection part DF as shown in FIG. 15 corresponding to FIG. 12.

In this regard, the light receiving area RF detects the amount of light as a sum of the spot TF and the stray light pattern WF, and may be impossible to detect only the amount of light of the spot TF necessary for calculation of the tracking error signal STE.

Here, the side at the inner circumference side in the stray light pattern WF is linear substantially in parallel to the longitudinal direction. Accordingly, the amount of light of the stray light pattern WF applied to the light receiving area RF constantly keeps nearly constant ratio to the amount of light of the stray light pattern WF applied to the stray light receiving areas RFN1 and RFN2.

Therefore, the optical disc device 10 can calculate the amount of light of the spot TF by canceling the amount of light of the stray light pattern WF applied to the light receiving area RF using the amounts of light of the stray light receiving areas RFN1 and RFN2.

Further, the optical disc device 10, in the similar manner with respect to the light receiving area RE, can calculate the amount of light of the spot TE by canceling the amount of light of the stray light pattern WE applied to the light receiving area RE using the amounts of light of the stray light receiving areas RFN1 and RFN2.

That is, the signal processing unit 13 of the optical disc device 10 can calculate a tracking error signal STE2 from which the influence by the stray light patterns in the detection areas RE and RF has been eliminated by performing calculation according to the following expression (5) in place of the above described expression (4).

$$STE2 = \{(SF-SE) - Kpp \times (SFN-SEN)\} - Kt \times (SH-SG) \quad (5)$$

Here, the coefficient Kpp is a value determined so that, in the case where the optimum coefficient Kt is determined according to the coefficient Kpp, the fluctuation range of the coefficient Kt may be the minimum when the reflectances of the respective recording layers Y in the optical disc 100 change.

A tracking control part 12AT of the servo-control part 12A (FIG. 6) generates a tracking drive signal STD based on the tracking error signal STE2, and supplies the signal to a tracking actuator 19T. The tracking actuator 19T performs so-called tracking control of driving the objective lens 18 in the tracking direction based on the tracking drive signal STD.

The optical disc device 10 also repeatedly performs the tracking control (that is, performs feedback control), and thereby, converges the amount of shift between the focus F1 of the light beam L1 and the desired track in the target recording layer YT with respect to the tracking direction to an arbitrary target value.

In this way, the optical disc device 10 is adapted to focus the focus F1 of the light beam L1 on the desired track in the target recording layer YT by performing the focus control and the tracking control.

Further, the optical disc device 10 is adapted to calculate a reproduced RF signal SRF by adding the light reception signals SA to SD according to the following expression (6) in a reproduced signal calculation circuit 13R of the signal processing unit 13.

$$SRF = SA + SB + SC + SD \quad (6)$$

The reproduced RF signal SRF corresponds to the amount of light of the entire reflected light beam LR0 including zero-order rays and represents a signal recorded in the optical disc 100. Then, the reproduced signal calculation circuit 13R is adapted to reproduce information recorded in the optical disc 100 by performing demodulation processing, decoding processing, or the like on the reproduced RF signal SRF.

1-5. Adjustment of Attachment Positions

Furthermore, in the optical pickup 17, the detection results in the light receiving parts DA and DJ are used when the attachment positions of the hologram element 27, the photodetector 29, etc. are adjusted.

That is, the optical pickup 17, after an optical disc for adjustment is mounted in its assembly process or the like, applies the light beam L1 to the optical disc for adjustment based on the control by the integrated control unit 11.

In response thereto, the reflected light beam LR0 of zero-order rays with astigmatism is applied to the light receiving part DA of the photodetector 29.

In the assembly process, fine adjustment of the attachment position with respect to the direction along the optical axis of the reflected light beam LR0 and the attachment position in the plane orthogonal to the optical axis of the photodetector 29 is made. In this regard, the photodetector 29 is adjusted so that the focus error signal SFE may take a value "0", the sum of the light reception signals SA and SB and the sum of the light reception signals SC and SD may be at the nearly equal signal level, and further, the sum of the light reception signals SA and SD and the sum of the light reception signals SB and SC may be nearly equal. Thereby, regarding the photodetector 29, the attachment position with respect to the direction along the optical axis of the reflected light beam LR0 is optimized and the attachment positions with respect to the longitudinal direction and the lateral direction are optimized.

Further, the attachment angle around the reference point P2 of the photodetector 29 is adjusted so that the sum of the light reception signals SJA and SJB and the sum of the light reception signals SJC and SJD generated by the light receiving part DJ may be at the nearly equal signal level. Thereby, the attachment angle of the photodetector 29 is also optimized with respect to the rotational direction around the reference point P2.

Furthermore, the position with respect to the direction along the optical axis of the reflected light beam LR0 of the hologram element 27 is adjusted so that the sum of the light reception signals SJA and SJD and the sum of the light reception signals SJB and SJC generated by the light receiving part DJ may be at the nearly equal signal level. Thereby, in the hologram element 27, the distances of the reflected light beams LR1J, LR1E, LR1F, LR1G, and LR1H from the reference point P2 are optimized.

1-6. Operations and Advantages

In the above described configuration, the optical pickup 17 of the optical disc device 10 applies the light beam L1 to the optical disc 100, and divides and separates the reflected light beam LR reflected by the optical disc 100 using the hologram element 27.

That is, the hologram element 27 allows the reflected light beam LR0 of zero-order rays to travel nearly straight, and separates the beam into reflected light beams LR1E to LR1J of first-order rays using the diffraction action of the areas 27E to 27J (FIG. 7A).

In this regard, the hologram element 27 diffracts the reflected light beams LR1E and LR1F containing the push-pull components, the lens-shift components, and the stray-light components toward the inner circumference side and the outer circumference side in the longitudinal direction, respectively. Further, the hologram element 27 diffracts the reflected light beams LR1G and LR1H containing the lens-shift components, and the stray-light components in the lateral direction, respectively, and further diffracts the reflected light beam LR1J in the oblique direction.

In response thereto, the photodetector 29 receives the reflected light beam LR0 using the light receiving areas RA to RD of the light receiving part DA and generates the light reception signals SA to SD. Further, the photodetector 29 receives the reflected light beams LR1E and LR1F using the light receiving area RE of the light receiving part DE and the light receiving area RF of the light receiving part DF, respectively, and generates the light reception signals SE and SF. Furthermore, the photodetector 29 receives the reflected light beams LR1G and LR1H using the light receiving area RG of the light receiving part DG and the light receiving area RH of the light receiving part DH, respectively, and generates the light reception signals SG and SH.

More over, the photodetector 29 receives the stray light using the stray light receiving areas REN1 and REN2 of the light receiving part DE and generates the light reception signal SEN, and receives the stray light using the stray light receiving areas RFN1 and RFN2 of the light receiving part DF and generates the light reception signal SFN. Further, the photodetector 29 receives the stray light using the stray light receiving areas RGN1 and RGN2 of the light receiving part DG and generates the light reception signal SGN, and receives the stray light using the stray light receiving areas RHN1 and RHN2 of the light receiving part DH and generates the light reception signal SHN.

The signal processing unit 13 calculates the focus error signal SFE according to the expression (3) using the focus error signal calculation circuit 13F. The focus control part 12AF of the servo-control part 12A performs the focus control based on the focus error signal SFE.

Further, the signal processing unit 13 calculates the tracking error signal STE2 according to the expression (5) using the tracking error signal calculation circuit 13T. The tracking control part 12AT of the servo-control part 12A performs the tracking control based on the tracking error signal STE2.

Furthermore, the signal processing unit 13 generates the reproduced RF signal SRF according to the expression (6) using the reproduced signal calculation circuit 13R, and reproduces the information recorded in the optical disc 100 based thereon.

Here, in the one-beam push-pull method, generally, in order to improve the signal level of the reproduced RF signal SRF, the light intensity of the reflected light beam LR0 of zero-order rays is made higher than the light intensity of the reflected light beam LR1 of first-order rays using the diffraction action of the hologram element 27.

With the improvement, in the photodetector 29, the application intensity of the reflected light beams LR1E, LR1F, LR1G, and LR1H of first-order rays become weaker and the S/N (Signal/Noise)-ratios of the light reception signal SE and the like become lower.

On this account, in the optical disc device 10, in the case where the stray light pattern W overlaps with the light receiving parts DE, DF, DG, and DH for receiving first-order rays in the photodetector 29, accuracy may drastically become lower such that the linearity of the tracking error signal STE1 becomes lower.

On the other hand, the hologram element 27 diffracts the reflected light beams LR1E and LR1F containing many push-pull components and the reflected light beams LR1G and LR1H containing many lens-shift components in different directions from one another.

Thereby, in the photodetector 29, the application of the stray light patterns WE and WF by the areas 27E and 27F to the light receiving parts DG and DH is avoidable and the application of the stray light patterns WG and WH by the areas 27E and 27F to the light receiving parts DE and DF is also avoidable.

Accordingly, in the photodetector 29, the light receiving parts DE and DF may be designed to avoid the zero-order rays and the stray light patterns W due to the areas 27E and 27F. Further, in the photodetector 29, the light receiving parts DG and DH may be designed to avoid the zero-order rays and the stray light patterns W due to the areas 27G and 27H. Therefore, the difficulty in design can be relaxed.

In this way, in the photodetector 29, the light receiving parts DE, DF, DG, and DH may be provided to effectively avoid the various stray light patterns W due to the plural recording layers Y having different interlayer distances and being deeper or shallower than the target recording layer YT in the optical disc 100.

In practice, in the case where no lens shift occurs, the photodetector 29 can avoid the application of the interlayer stray light to the light receiving parts DE, DF, DG, and DH as shown in FIGS. 10 to 12.

Accordingly, in the optical disc device 10, in the case where no lens shift occurs, the stray light patterns W do not overlap with the light receiving parts DE, DF, DG, and DH and a good quality tracking error signal can be generated.

In the photodetector 29, in the case where the lens shift of the objective lens 18 occurs due to the eccentricity of the track grooves in the optical disc 100 or the like, as shown in FIG. 15, the stray light pattern W due to the recording layer Y having the shorter interlayer distance may overlap with the light receiving area RE or RF.

Figure 3:
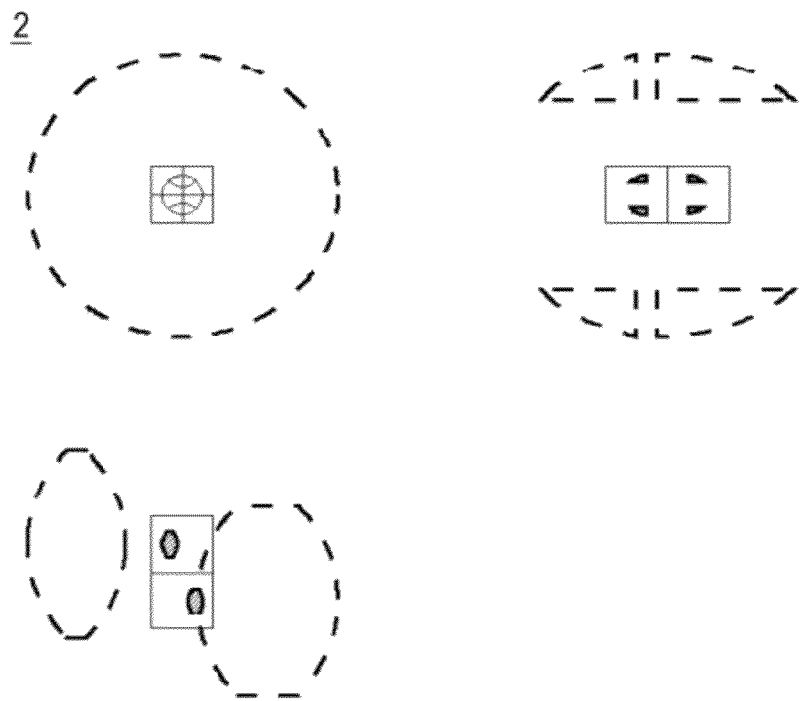
FIG. 3 is a schematic diagram showing an application condition of interlayer stray light in related art (2).

Especially, as shown in FIG. 3, in the case where the light receiving areas RE and RF are adjacently provided, the stray light pattern WF or WE may be insufficiently applied to the light receiving area RE or RF and the stray-light components in the light receiving area RE or RF may not be cancelled by the amounts of light in the stray light receiving areas.

Figure 14:
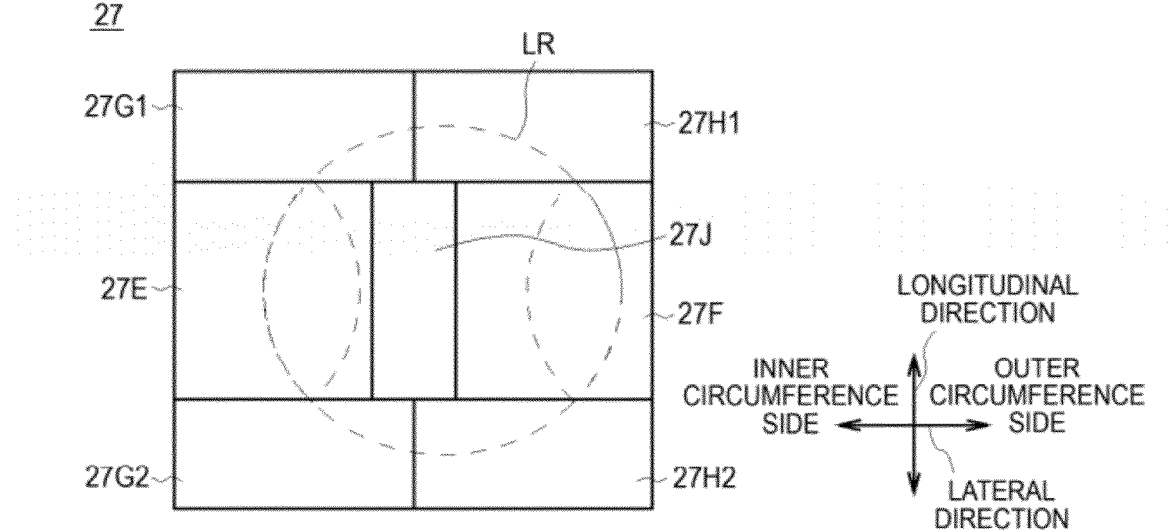
FIG. 14 is a schematic diagram for explanation of movement of an application position of the reflected light beam due to a lens shift.

On the other hand, in the photodetector 29, the light receiving part DE and the light receiving part DF are separately provided to satisfy the expression (2) (FIG. 9). Accordingly, in the case where the lens shift of the objective lens 18 occurs or the like, the stray light pattern WE may be applied to the light receiving area RE of the photodetector 29, but the application of the stray light pattern WF is avoidable (FIG. 14). Further, the application of the stray light pattern WE is avoidable likewise in the light receiving area RF.

In this regard, even in the case where the stray light is applied to the light receiving area RE and the stray-light components are contained in the light reception signal SE, the photodetector 29 is not affected by the stray light pattern WF and the amounts of light according to the stray-light components can be detected by the stray light receiving areas REN1 and REN2.

Similarly, even in the case where the stray light is applied to the light receiving area RF and the stray-light components are contained in the light reception signal SF, the photodetector 29 is not affected by the stray light pattern WE and the amounts of light according to the stray-light components can be detected by the stray light receiving areas RFN1 and RFN2.

Accordingly, in the optical disc device 10, the calculation of the expression (5) is performed, and thereby, the stray-light components can be reliably cancelled from the light reception signals SE and SF generated by the light receiving areas RE and RF.

Further, in the photodetector 29, in the light receiving part DE, the two stray light receiving areas REN1 and REN2 are provided to sandwich the light receiving area RE from the longitudinal directions.

Accordingly, even in the case where the reflected light beam LR0 is not perpendicularly entered and the attachment positions, angles, etc. of the photodetector 29, the hologram element 27, etc. are shifted, the light reception signal SEN according to the amount of light of the stray light pattern WE applied to the light receiving area RE can be generated. The reception signal SFN can be generated in the same manner with respect to the stray light receiving areas RFN1 and RFN2.

Further, as shown in FIG. 16 corresponding to FIG. 3, in the case where the light receiving areas RE and RF are adjacently provided, the other stray light patterns WME and WMF overlap and the spot TE or TF overlaps, and thereby, a complex interference fringe may be formed.

Especially, in this case, due to the surface wobbling of the optical disc 100, lens shift, or the like, the condition of the interference fringe may change and cause the drastic reduction of the quality of the tracking error signal, and further, it may be difficult to eliminate the influence of the interference fringe from the tracking error signal.

Further, in the configuration, in the case where the lens shift occurs when the optical axis of the zero-order rays does not perpendicularly enter the photodetector and the attachment positions, angles, etc. of the hologram element and the photodetector have errors, imbalanced application of the other layer diffraction interlayer stray light patterns WME and WMF may occur. Concurrently, an offset may occur in the tracking signal and the accuracy of the tracking control may be reduced.

Regarding this point, in the photodetector 29, the light receiving RE and RF are provided separately from each other, and the other layer diffraction interlayer stray light patterns WME and WMF due to the other layer diffraction stray light beam LM can be separated from each other without overlapping (FIG. 13).

Accordingly, in the photodetector 29, formation of the interference fringe in the light receiving areas RE and RF can be eliminated and the noise components contained in the light reception signals SE and SF can be drastically reduced according to variations of the interference fringe or the like.

In this way, the optical disc device 10 can calculate the tracking error signal STE2 with high accuracy from which most of the influence of stray light has been eliminated by performing the calculation processing according to the expression (5) based on the light reception signals S generated by the photodetector 29 in which the light receiving areas RE and RF are separately provided.

Further, the optical pickup 17 collects the reflected light beam LR1E and the like applied to the light receiving parts DE, DF, DG, and DH in relatively small beam spots by the design of the collective lens 26 and the hologram element 27.

Accordingly, the optical pickup 17 can suppress the areas of the respective light receiving areas in the photodetector 29 smaller and also can suppress the amounts of movement of the respective beam spots smaller in the case where the lens shift of the objective lens 18 occurs.

In this regard, the optical pickup 17 collects the stray light pattern W in the minimum range, and the application range of the stray light pattern W can be narrowed to the minimum.

Furthermore, in the optical pickup 17, in its assembly process or the like, the attachment positions, attachment angles, etc. of the hologram element 27, the photodetector 29, etc. are adjusted using the detection results in the light receiving parts DA and DJ.

Thereby, in the optical disc device 10, when various perturbations occur in the reflected light beam LR etc., the respective reflected light beams LR1E to LR1J can be prevented from lying off the light receiving areas RE to RG and RJA to RJD. Accordingly, the optical disc device 10 can prevent occurrence of problems that offset components are contained in various kinds of signals of the tracking error signal STE 2 and the like and the signal levels become lower.

According to the above described configuration, the optical pickup 17 of the optical disc device 10 diffracts the reflected light beam LR using the hologram element 27. The hologram element 27 separates and advances the reflected light beams LR1E and LR1F containing the push-pull components and the lens-shift components toward the inner circumference side and the outer circumference side in the longitudinal direction, and advances the reflected light beams LR1G and LR1H containing the lens-shift components in the lateral direction, respectively. The photodetector 29 generates the light reception signals S using the stray light receiving areas respectively provided adjacent to the light receiving areas RE and RF separated by the distance d2 in the lateral direction, the light receiving areas RG and RH, and the light receiving areas RE, RF, RG, and RH. The optical disc device 10 can eliminate the influence of the stray light patterns W and the lens shift and perform high-accuracy tracking control by calculating the tracking error signal STE2 according to the expression (5) using the light reception signals S.

2. Second Embodiment

2-1. Configuration of Optical Disc Device and Optical Pickup

An optical disc device 50 according to the second embodiment is different in that a signal processing unit 53 is provided in place of the signal processing unit 13, but the rest of the configuration is the same compared to the optical disc 10 (FIG. 4) according to the first embodiment.

The signal processing unit 53 is different in that a tracking error signal calculation circuit 53T is provided in place of the tracking error signal calculation circuit 13T, but the rest of the configuration is the same compared to the signal processing unit 13 according to the first embodiment.

2-2. Application of Stray Light and Generation of Tracking Error Signal

In the second embodiment, the interlayer distances between the recording layers Y in the optical disc 100 (FIGS. 5A and 5B) are extremely small.

Here, for example, the case where the recording layer Y0 in the optical disc 100 is selected as the target recording layer YT and the focus F1 of the light beam L1 is focused on the recording layer Y0 (FIG. 5A) is assumed.

In this case, the interlayer stray light beam LN1 by the recording layer Y1 close to the recording layer Y0 forms a group of stray light patterns W1 as shown in FIG. 17 corresponding to FIG. 12 on the photodetector 29.

In FIG. 17, stray light patterns WE and WF of the group of stray light patterns W1 overlap with the light receiving parts DE and DF, respectively. In this regard, the light reception signals SE and SF contain the stray light patterns WE and WF, respectively, and the stray light reception signals SEN and SFN generated by the stray light receiving areas REN1 and REN2 and the stray light receiving areas RFN1 and RFN2 contain the stray light patterns WE and WF, respectively.

The signal processing unit 53 can eliminate the influence of the stray light patterns WE and WF as is the case of the first embodiment by calculating the tracking error signal STE2 using the expression (5).

Next, the case where the lens shift of the objective lens 18 occurs and, as shown in FIG. 14, the application position of the reflected light beam LR0 to the hologram element 27 moves in the lateral direction is assumed.

Figure 18:
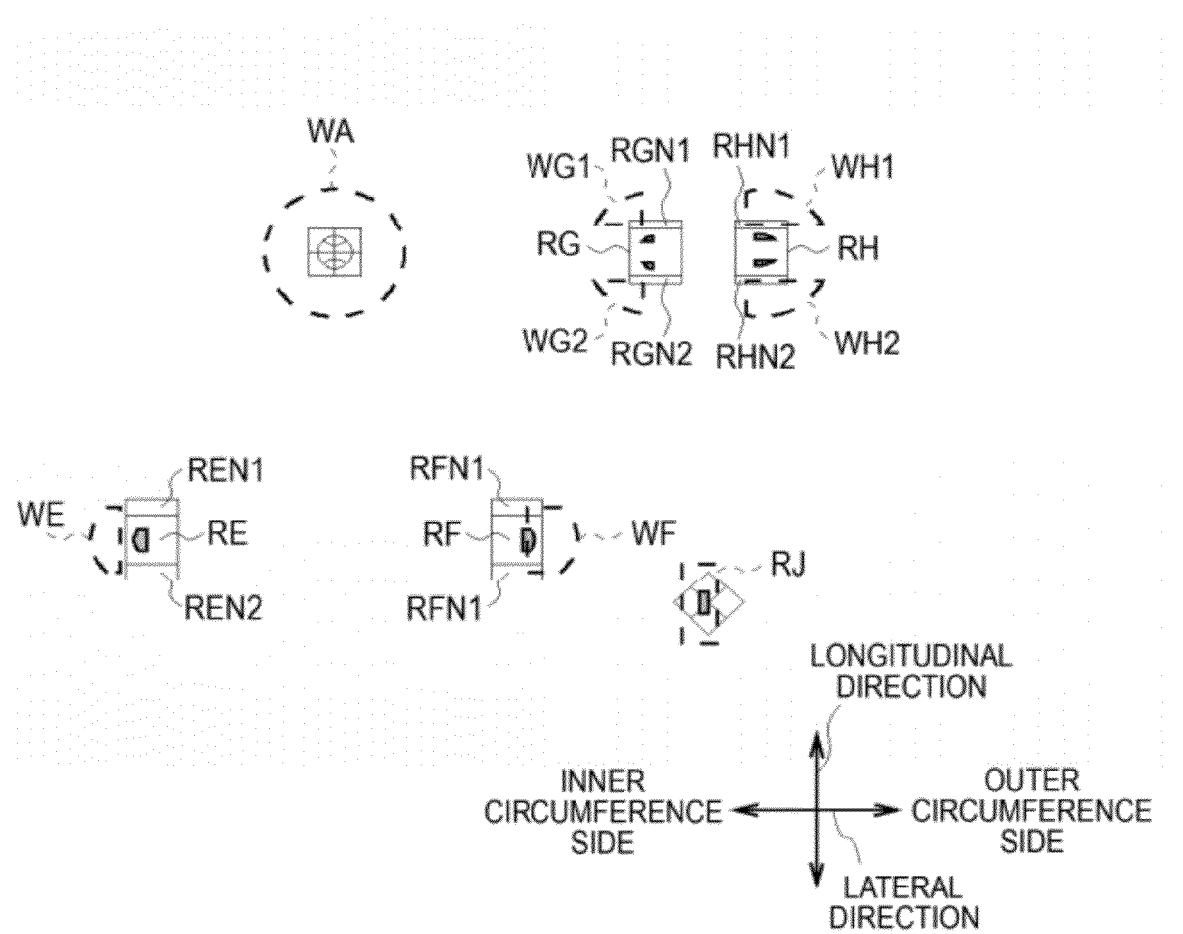
FIG. 18 is a schematic diagram for explanation of formation of a stray light pattern (6).

In this regard, in the photodetector 29, as shown in FIG. 18 corresponding to FIG. 17, the stray light pattern WE is shortened in the outer circumference direction and the light pattern WF is extended in the inner circumference direction.

Here, the layer distance between the target recording layer YT and the recording layer Y generating the interlayer stray light beam LN in the optical disc 100 is a stray light layer distance dn (FIGS. 5A and 5B). Further, the stray light component contained in the term (SF−SE) in the expression (5) (hereinafter, referred to as the first term) is called a push-pull stray light component SNpp.

Figure 19A:
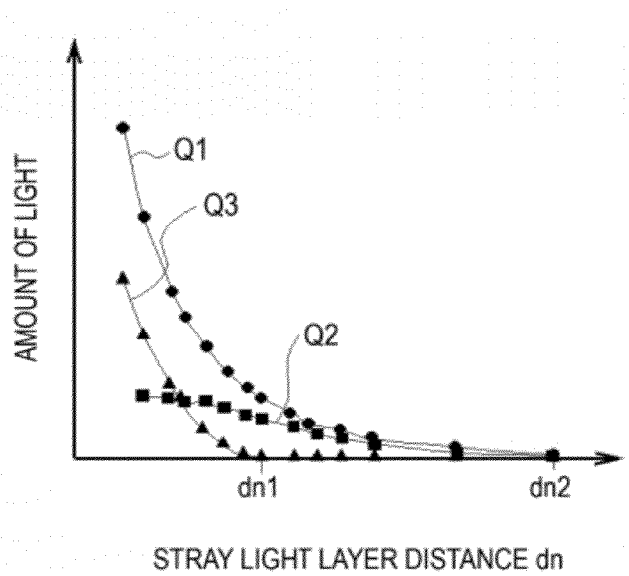
FIGS. 19A and 19B are schematic diagrams showing relationships between a stray light layer distance and an amount of light when a lens shift occurs.

The relationship of the push-pull stray light component SNpp to the stray light layer distance dn when the lens shift occurs in an optical pickup 57 is shown by a characteristic curve Q1 in FIG. 19A.

According to the characteristic curve Q1, if the stray light layer distance dn is relatively large (dn>dn2), the push-pull stray light component SNpp takes a value "0". This corresponds to the condition in which the stray light patterns W overlap with none of the light receiving areas RE and RF as shown in FIGS. 10, 12, and 13.

Further, according to the characteristic curve Q1, as the stray light layer distance dn becomes smaller, i.e., if dn1<dn2, the value of the push-pull stray light component SNpp gradually increases.

Here, regarding the term of (SFN−SEN) (hereinafter, referred to as the second term) in the expression (5), the relationship to the stray light layer distance dn is shown by a characteristic curve Q2 in FIG. 19A. This corresponds to the condition in which the stray light pattern WE or WF overlaps with the light receiving area RE or RF due to lens shift as shown in FIG. 15.

According to the characteristic curve Q2, if the stray light layer distance dn is within a range of (dn1<dn<dn2), the characteristic curves Q1 and Q2 have a nearly proportional relation. This means that, by subtracting a value obtained by multiplying the second term by the coefficient Kpp from the first term, the push-pull stray light component SNpp contained in the first term can be cancelled.

Further, according to the characteristic curve Q1, as the stray light layer distance dn becomes even smaller, i.e., if dn<dn1, the value of the push-pull stray light component SNpp sharply increases. However, in the characteristic curve Q2, the value of (SFN−SEN) increases only gradually, and the curves have no proportional relationship. This means that, if dn<dn1, it may be impossible to cancel the push-pull stray light component SNpp according to the expression (5).

Here, when attention is focused on the stray light receiving areas RGN1, RGN2, RHN1, and RHN2 of the photodetector 29, in FIGS. 17 and 18, the stray light patterns WG1, WG2, WH1, and WH2 overlap with the areas, respectively.

Furthermore, in comparison between FIGS. 17 and 18, in the state of FIG. 18 in which the lens shift occurs, the stray light patterns WG1 and WG2 are shortened in the outer circumference direction, respectively, and the stray light patterns WH1 and WH2 are extended in the inner circumference direction, respectively. Accordingly, in the case of FIG. 18, compared to the case of FIG. 17, the value of the light reception signal SGN decreases and the value of the light reception signal SHN increases.

The change in shape of the stray light pattern W due to lens shift is caused by the movement of the application position of the reflected light beam LR to the hologram element 27 as shown in FIG. 14.

In consideration of the points, it is expected that there are some correlations between the increase of the stray light component in the light receiving area RF due to the lens shift and the increase of the amount of received stray light by the stray light receiving areas RHN1 and RHN2, i.e., the amount of increase of the light reception signal SHN. Similarly, it is expected that there are some correlations between the decrease of the stray light component in the light receiving area RE due to the lens shift and the decrease of the amount of received stray light by the stray light receiving areas RGN1 and RGN2, i.e., the amount of decrease of the light reception signal SGN.

In practice, regarding the value of (SHN−SGN), like (SFN−SEN), the relationship to the stray light layer distance dn is shown by a characteristic curve Q3 in FIG. 19A.

The characteristic curve Q3 takes a value nearly "0", if the stray light layer distance dn is relatively large, i.e., dn>dn1. This means that the stray light patterns WG1, WG2, WH1, and WH2 overlap with non of the stray light receiving areas RGN1, RGN2, RHN1, and RHN2 if the stray light layer distance dn is relatively large as shown in FIGS. 10, 11, and 12.

On the other hand, if the stray light layer distance dn is relatively small, i.e., dn≦dn1, as the stray light layer distance dn becomes smaller, the value of (SHN−SGN) sharply increases, and thus, the characteristic curve Q3 has a nearly proportional relationship to the characteristic curve Q1.

Accordingly, a tracking error signal calculation circuit 53T of the signal processing unit 53 is adapted to calculate a tracking error signal STE3 according to the following expression (7) instead of the above described expression (5).

$$STE3=\{(SF-SE)-Kpp\times(SFN-SEN)-Kls\times(SHN-SGN)\}-kt\times(SH-SG) \quad (7)$$

Here, the coefficient Kls is, as in the case of the coefficient Kpp, a value determined so that, in the case where the optimum coefficient Kt is determined according to the coefficients Kls and Kpp, the fluctuation range of the coefficient Kt may be the minimum when the reflectances of the respective recording layers Y in the optical disc 100 change.

Figure 19B:
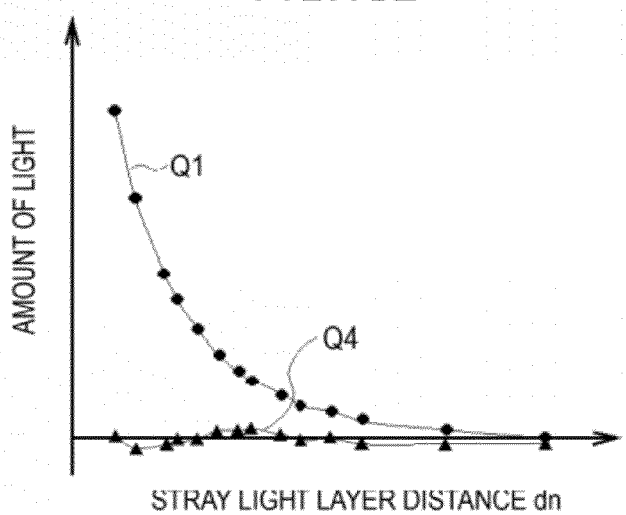

Here, in expression (7), the relationship between the value of the push-pull stray light component SNpp after cancelled by the term of (SFN−SEN) and the term of (SHN−SGN) and the stray light layer distance dn is shown as a characteristic curve Q4 in FIG. 19B corresponding to FIG. 19A. In FIG. 19B, the characteristic curve Q1 is also shown for comparison.

In FIG. 19B, the characteristic curve Q4 takes values of amounts of light of nearly "0" over nearly the entire range regardless of the value of the stray light layer distance dn. From that, in expression (7), it is known that the push-pull stray light component SNpp contained in the term of (SF−SE) is well cancelled by the term of (SFN−SEN) and the term of (SHN−SGN).

As described above, the signal processing unit 53 is adapted to perform calculation according to the expression (7) using the light reception results in the stray light receiving areas RGN1, RGN2, RHN1, and RHN2 as well. Thereby, the signal processing unit 53 can generate the high-quality tracking error signal STE3 in which the push-pull stray light component SNpp has been well cancelled even in the case where the stray light layer distance do is extremely small and the lens shift occurs.

2-3. Operations and Advantages

In the above described configuration, the optical pickup 57 of the optical disc device 50 divides and separates the reflected light beam LR using the hologram element 27 as is the case of the first embodiment.

The photodetector 29 generates the light reception signals SA, SB, SC, and SD using the light receiving areas RA, RB, RC, and RD, respectively, and generates the light reception signals SE, SF, SG, and SH using the light receiving areas RE, RF, RG, and RH, respectively. Further, the photodetector 29 receives stray light using the respective stray light receiving areas and generates light reception signals.

The signal processing unit 53 calculates the tracking error signal STE3 according to the expression (7) using the tracking error signal calculation circuit 53T, and supplies the signal to the tracking control part 12AT for tracking control.

In this regard, the signal processing unit 53 uses the light reception results in the stray light receiving areas RGN1, RGN2, RHN1, and RHN2 as well. Especially, the shapes and arrangement of the stray light receiving areas RGN1, RGN2, RHN1, and RHN2 are determined so that the characteristic curve Q3 (FIG. 19A) may be nearly proportional to the characteristic curve Q1 when the stray light layer distance dn is small (dn<dn1).

As a result, in the optical disc device 50, especially in the case where the stray light layer distance dn is small and the lens shift occurs, high-accuracy tracking control can be performed based on the high-quality tracking error signal STE3 in which the push-pull stray light component SNpp has been mostly cancelled.

Further, in the photodetector 29, in the light receiving part DG, the two stray light receiving areas RGN1 and RGN2 are provided to sandwich the light receiving area RG from the longitudinal directions.

Accordingly, even in the case where the reflected light beam LR0 is not perpendicularly entered and the attachment positions, angles, etc. of the photodetector 29, the hologram element 27, etc. are shifted, the light reception signal SGN according to the amount of light of the stray light pattern WE applied to the light receiving area RE can be generated. The reception signal SHN can be generated in the same manner with respect to the stray light receiving areas RHN1 and RHN2.

Further, in the expression (7), a term of subtraction of (SHN−SGN) multiplied by the predetermined coefficient Kls is added to the expression (5). Accordingly, in the tracking error signal calculation circuit 53T of the signal processing unit 53, only the extremely simple calculation processing such as subtraction processing and multiplication processing is increased, and it is unnecessary to dare to enhance the processing power or the like from the configuration of the signal processing unit 13 in the first embodiment.

Further, the optical disc device 50 have the advantages as those of the first embodiment in other respects.

According to the above described configuration, the optical pickup 57 of the optical disc device 50 diffracts the reflected light beam LR using the hologram element 27, and divides and separates the beam into plural rays. The photodetector 29 generates the light reception signals SE, SF, SG, and SH using the light receiving areas RE, RF, RG, and RH. Further, the photodetector 29 generates the light reception signals SEN, SFN, SGN, and SHN using the stray light receiving areas REN1, REN2, RFN1, RFN2, RGN1, RGN2, RHN1, and RHN2. The signal processing unit 53 generates the tracking error signal STE3 in which the push-pull stray light component SNpp contained in the light reception signals SE and SF have been cancelled using the light reception signals SGN and SHN in addition to the light reception signals SEN and SFN according to the expression (7). As a result, in the optical disc device 50, even in the case where the stray light layer distance do is small, the high-accuracy tracking control can be performed based on the high-quality tracking error signal STE3 in which the push-pull stray light component SNpp has been mostly cancelled.

3. Third Embodiment

3-1. Configuration of Optical Disc Device and Optical Pickup

An optical disc device 70 according to the third embodiment is different in that a signal processing unit 73 and an optical pickup 77 are provided in place of the signal processing unit 13 and the optical pickup 17, but the rest of the configuration is the same compared to the optical disc 10 (FIG. 4) according to the first embodiment.

The signal processing unit 73 is different in that a reproduced signal calculation circuit 73R is provided in place of the reproduced signal calculation circuit 13R, but the rest of the configuration is the same compared to the signal processing unit 13 according to the first embodiment (details will be described later).

The optical pickup 77 is different in that a hologram element 87 and a photodetector 89 are provided in place of the hologram element 27 and the photodetector 29, but the rest of the configuration is the same compared to the optical pickup 17 (FIG. 6) according to the first embodiment.

The hologram element 87 (FIGS. 7A and 7B) of the optical pickup 77 is divided into areas 87E, 87F, 87G1, 87G2, 87H1, 87H2, and 87J in the same division pattern compared to the hologram element 27 according to the first embodiment.

In the areas 87G1, 87G2, 87H1, and 87H2, the same diffraction gratings as those in the 27G1, 27G2, 27H1, and 27H2 are formed, respectively, and the areas are adapted to respectively diffract parts of the reflected light beam LR.

On the other hand, the areas 87E and 87F include diffraction gratings formed to have different properties compared to the areas 27E and 27F, and form so-called brazed holograms. Accordingly, the areas 87E and 87F are adapted to diffract nearly the entire reflected light beam LR as first-order rays into reflected light beams LR1E and LR1F.

That is, the hologram element 87 is adapted to generate the reflected light beam LR0 of zero-order rays only with respect to the parts other than the areas 87E and 87F.

Incidentally, the areas 87E and 87F are designed so that the diffraction angles of the first-order rays may be smaller compared to the areas 27E and 27F.

Further, the area 87J diffracts a part of the reflected light beam LR0 like the area 27J, but provides aberration to the degree that does not completely cancel the astigmatism provided by the cylindrical lens 28.

Figure 20:
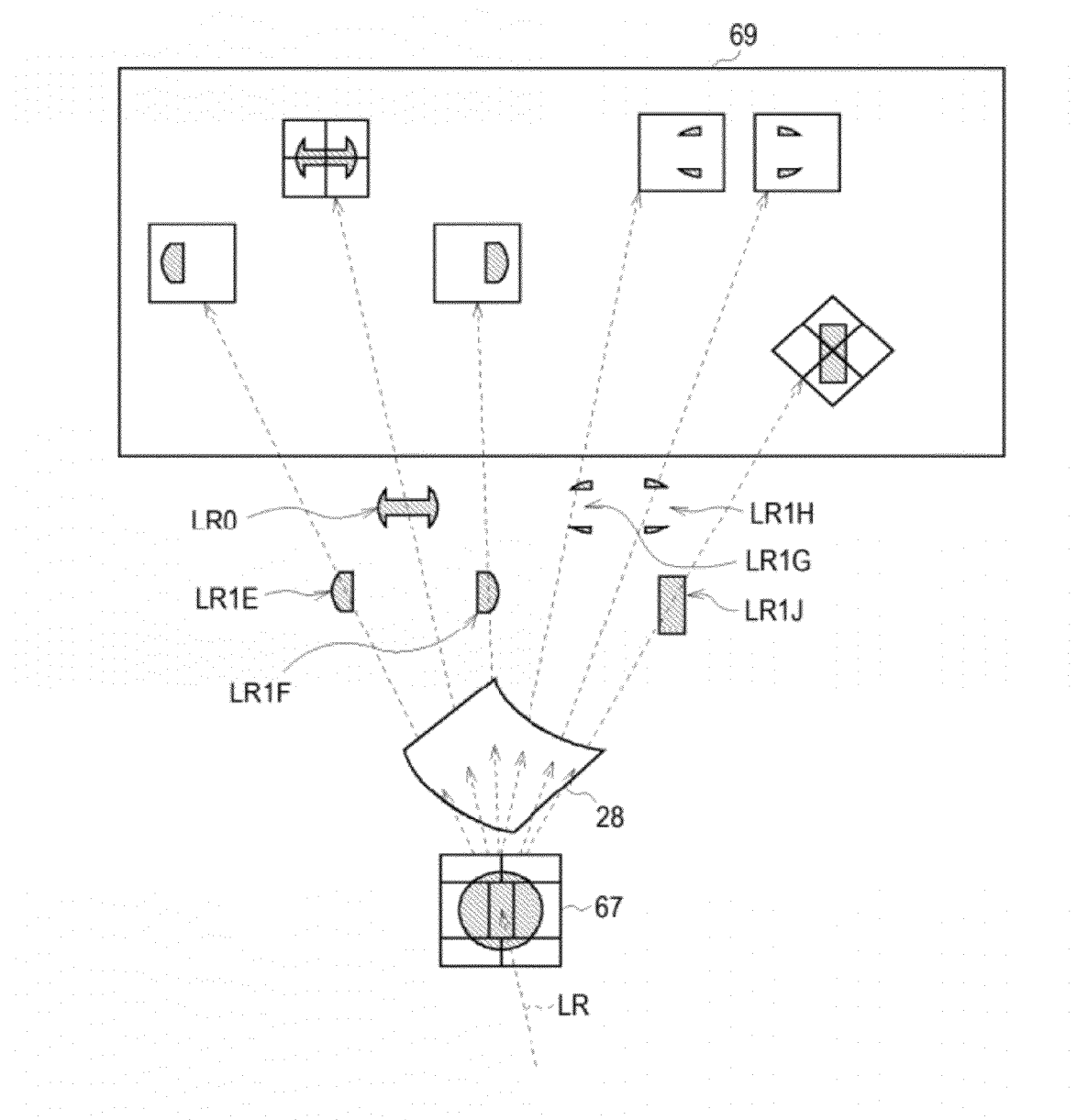
FIG. 20 is a schematic diagram showing a state of separation of the reflected light beam according to the third embodiment.

Here, FIG. 20 corresponding to FIG. 8 schematically shows a state in which the reflected light beam LR is divided by the hologram element 87 and applied to the photodetector 89.

Figure 21:
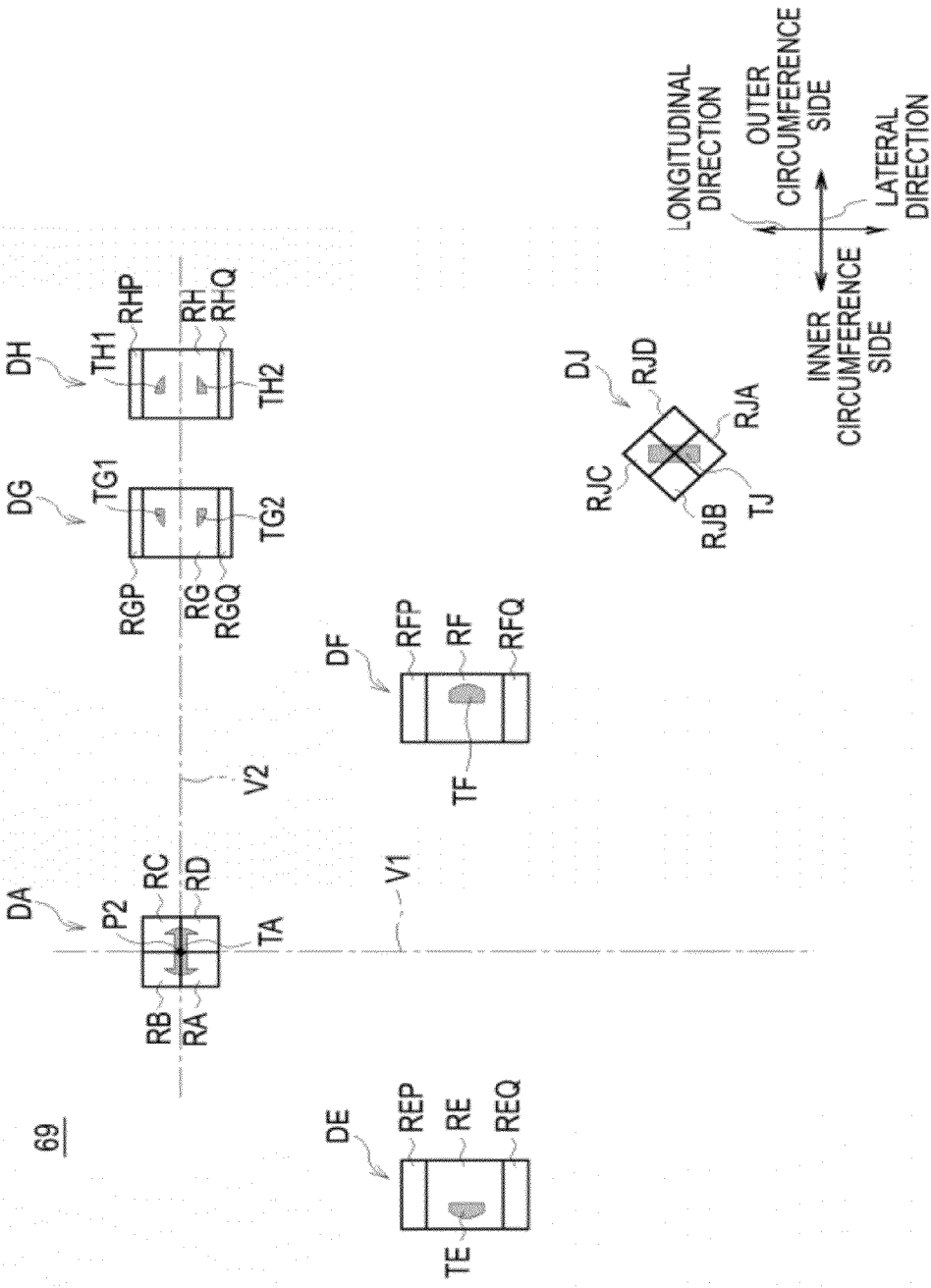
FIG. 21 is a schematic diagram showing a configuration of a photodetector according to the third embodiment.

The photodetector 89 is different in that the light receiving parts DE and DF are provided close to the light receiving part DA with respect to the longitudinal direction, but the rest of the configuration is the same compared to the photodetector 29 as shown in FIG. 21 corresponding to FIG. 9. That is, the distance d2 between the light receiving parts DE and DF is designed to satisfy the expression (2).

In FIG. 21, the spot TA formed by application of the reflected light beam LR0 of zero-order rays to the light receiving part DA has a shape with a lack of the part corresponding to the areas 87E and 87F in the hologram element 87, i.e., the part corresponding to the push-pull area.

Further, the spot TJ formed by application of the reflected light beam LR1J to the light receiving part DJ is slightly enlarged compared to the first embodiment (FIG. 9).

The light receiving areas RA, RB, RC, and RD respectively generate light reception signals SA, SB, SC, and SD according to light intensity. Further, the light receiving areas RE, RF, RG, RH, RJA, RJB, RJC, and RJD respectively generate the light reception signals SE, SF, SG, SH, SJA, SJB, SJC, and SJD according to light intensity. Furthermore, the respective stray light receiving areas respectively generate light reception signals according to light intensity.

As described above, in the optical disc device 70 according to the third embodiment, the push-pull area is missed in the reflected light beam LR0 of zero-order rays, and the spot TJ formed in the light receiving part DJ is relatively large.

3-2. Application of Stray Light and Arrangement of Light Receiving Parts

Figure 22:
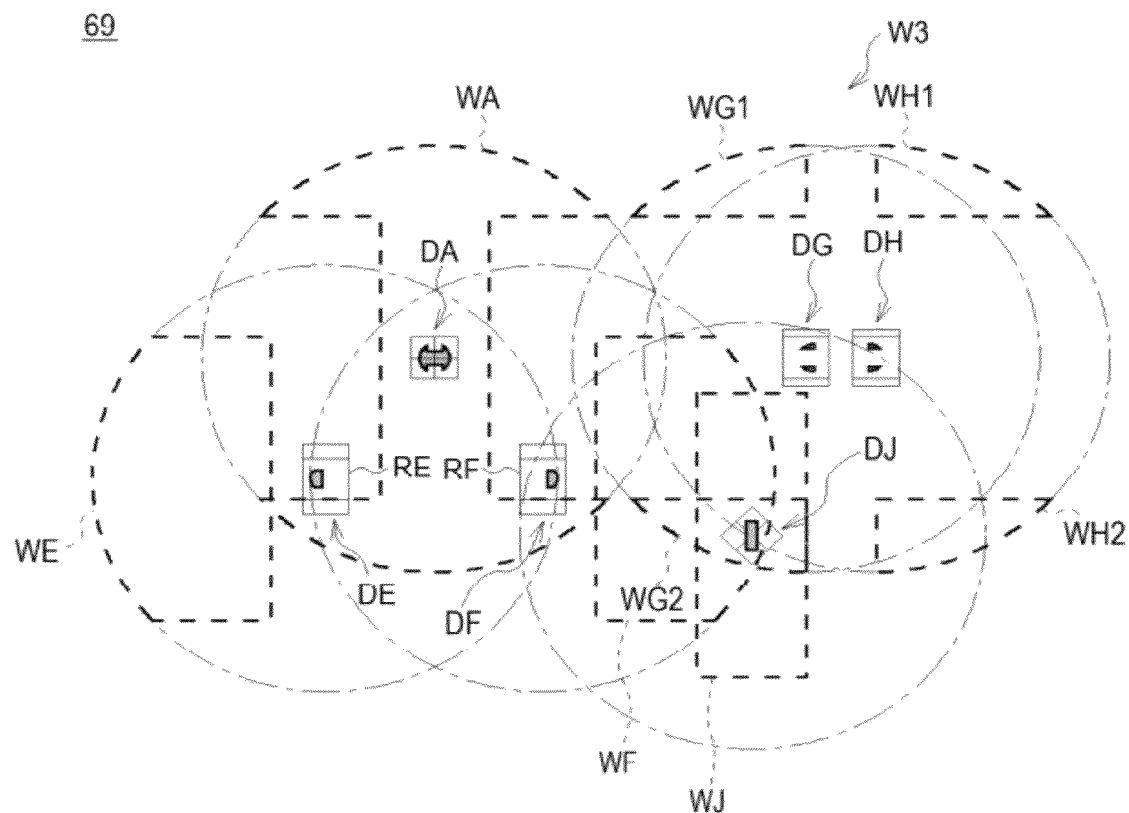
FIG. 22 is a schematic diagram for explanation of formation of a stray light pattern according to the third embodiment.

In the case where the deepest recording layer Y0 in the optical disc 100 is the target recording layer YT (FIG. 5A), the group of stray light patterns W3 by the interlayer stray light beam LN3 is formed as shown in FIG. 22 corresponding to FIG. 10.

In the photodetector 89, like in the photodetector 29 in the first embodiment, the distance d2 between the light receiving parts DE and DF is designed to satisfy the expression (2). Accordingly, the light receiving areas RE and RF overlap with none of the stray light patterns WE and WF when no lens shift of the objective lens 18 occurs.

Further, the light receiving areas RE and RF overlap with none of the stray light patterns WG1, WG2, WH1, and WH2 when no lens shift of the objective lens 18 occurs.

Furthermore, the light receiving parts DG and DH overlap with none of the stray light patterns WA, WE, WF, WG1, WG2, WH1, and WH2 when no lens shift of the objective lens 18 occurs as in the case of the photodetector 29.

On the other hand, in the photodetector 89, as described above, the light receiving parts DE and DF are provided close to the light receiving part DA with respect to the longitudinal direction, and the stray light pattern WA overlaps with the light receiving areas RE and RF.

3-3. Focus Control and Tracking Control

In the third embodiment, as described above, the part corresponding to the push-pull area is missed in the reflected light beam LR0 of zero-order rays.

The focus error signal calculation circuit 13F calculates a focus error signal SFE according to the expression (3) and supplies the signal to the focus control part 12AF of the servo-control part 12A as is the case of the first embodiment.

Here, since the part corresponding to the push-pull area is missed in the reflected light beam LR0, the light reception signals SA, SB, SC, and SD hardly contain the push-pull components. Accordingly, the focus error signal SFE hardly contains the push-pull component.

Further, the tracking error signal calculation circuit 13T calculates the tracking error signal STE2 according to the expression (5), and supplies the signal to the tracking control part 12AT of the servo-control part 12A as is the case of the first embodiment.

Here, both the light reception signals SE and SF contain components due to the stray light pattern WA.

However, the stray light pattern WA (FIG. 22) has a shape nearly symmetric with a virtual straight line V1 as a symmetric axis. Further, the light receiving parts DE and DF are provided nearly symmetrically with the virtual straight line V1 as a symmetric axis. Accordingly, the components due to the stray light pattern WA contained in the light reception signals SE and SF are nearly equal to each other.

Further, in the expression (5), subtraction of the light reception signals SE and SF is performed. Accordingly, when the tracking error signal STE is calculated according to the expression (5), the components due to the stray light pattern WA contained in the light reception signals SE and SF are cancelled and hardly affect the tracking error signal STE.

Further, in the reproduced signal calculation circuit 73R, the reproduced RF signal SRF is calculated according to the following expression (8) instead of the expression (6).

$$SRF2=SA+SB+SC+SD+SE+SF \qquad (8)$$

In the expression (8), no push-pull component is contained in the reflected light beam LR0 of zero-order rays, and thus, the light reception signals SE and SF corresponding to the push-pull component are added compared to the expression (6) for inclusion of the push-pull component.

3-4. Adjustment of Attachment Positions

In the optical pickup 77, in its assembly process or the like, the detection results in the light receiving parts DA and DJ are used for adjustment of the attachment positions, the attachment angles, and the like of the hologram element 87, the photodetector 89, etc. as is the case of the first embodiment.

That is, fine adjustment of the attachment position with respect to the direction along the optical axis of the reflected light beam LR0 and the attachment position in the plane orthogonal to the optical axis of the photodetector 89 is made. In this regard, the photodetector 89 is adjusted so that the focus error signal SFE may take a value "0", the sum of the light reception signals SA and SB and the sum of the light reception signals SC and SD may be at the nearly equal signal level, and further, the sum of the light reception signals SA and SD and the sum of the light reception signals SB and SC may be nearly equal.

Further, the attachment angle around the reference point P2 of the photodetector 89 is adjusted so that the sum of the light reception signals SJA and SJB and the sum of the light reception signals SJC and SJD generated by the light receiving part DJ may be at the nearly equal signal level.

Furthermore, the position with respect to the direction along the optical axis of the reflected light beam LR0 of the hologram element 87 is adjusted so that the sum of the light reception signals SJA and SJD and the sum of the light reception signals SJB and SJC generated by the light receiving part DJ may be at the nearly equal signal level.

3-5. Operations and Advantages

In the above described configuration, the optical pickup 77 of the optical disc device 70 applies the light beam L1 to the optical disc 100, and divides and separates the reflected light beam LR reflected by the optical disc 100 using the hologram element 87 as is the case of the first embodiment.

That is, the hologram element 87, regarding the parts other than the areas 87E and 87F, allows the reflected light beam LR0 of zero-order rays to travel nearly straight, and separates the beam into reflected light beams LR1E to LR1J of first-order rays using the diffraction action of the areas 87E to 87J.

In this regard, the hologram element 87 diffracts the reflected light beams LR1E and LR1F toward the inner circumference side and the outer circumference side in the longitudinal direction, respectively, diffracts the reflected light beams LR1G and LR1H in the lateral direction, respectively, and further diffracts the reflected light beam LR1J in the oblique direction.

In response thereto, the photodetector 89 generates the light reception signals SA, SB, SC, and SD using the light receiving areas RA, RB, RC, and RD, respectively, and generates the light reception signals SE, SF, SG, and SH using the light receiving areas RE, RF, RG, and RH, respectively. Further, the photodetector 89 receives the stray light using the stray light receiving areas and generates the light reception signal.

The signal processing unit 73 calculates the focus error signal SFE according to the expression (3) using the focus error signal calculation circuit 13F, and supplies the signal to the focus control part 12AF for focus control.

Further, the signal processing unit 73 calculates the tracking error signal STE2 according to the expression (5) using the tracking error signal calculation circuit 13T, and supplies the signal to the tracking control part 12AT for tracking control.

Furthermore, the signal processing unit 73 generates the reproduced RF signal SRF according to the expression (8) using the reproduced signal calculation circuit 73R, and reproduces the information recorded in the optical disc 100 based thereon.

Here, in the photodetector 89, the stray light pattern WA overlaps with the light receiving areas RE and RF. However, the components due to the stray light pattern WA contained in the light reception signals SE and SF are nearly equal to each other.

Accordingly, the signal processing unit 73 can calculate the tracking error signal STE2 in which components of the stray light patterns WA have been cancelled by performing the calculation according to the expression (5) as is the case of the first embodiment.

Further, in the photodetector 89, the distance d2 between the light receiving parts DE and DF is designed to satisfy the expression (2). Accordingly, the light receiving areas RE and RF overlap with none of the stray light patterns WE and WF when no lens shift of the objective lens 18 occurs. Further, the light receiving areas RE and RF overlap with none of the stray light patterns WG1, WG2, WH1, and WH2 when no lens shift of the objective lens 18 occurs as is the case of the first embodiment.

Furthermore, the light receiving areas RG and RH overlap with none of the stray light patterns WA, WE, WF, WG1, WG2, WH1, and WH2 when no lens shift of the objective lens 18 occurs as is the case of the first embodiment.

Accordingly, the signal processing unit 73 can calculate the tracking error signal STE2 without influence by the stray light patterns WE, WF, WG1, WG2, WH1, and WH2 when no lens shift of the objective lens 18 occurs by performing calculation according to the expression (5).

Furthermore, when the stray light pattern WE overlaps with the light receiving area RE due to the lens shift or the like, the stray light pattern WE is applied to the stray light receiving areas REN1 and REN2 only by the amount of light at a constant ratio to the amount of light of the stray light pattern WE applied to the light receiving area RE (FIG. 14). Similarly, the stray light pattern WF can be applied to the stray light receiving areas RFN1 and RFN2.

Accordingly, the signal processing unit 73 can calculate the tracking error signal STE2 in which components of the stray light patterns WE and WE have been cancelled by performing the calculation according to the expression (5) even in the case where the lens shift of the objective lens 18 occurs.

Further, no push-pull component is contained in the reflected light beam LR0 of zero-order rays, and thus, the focus error signal SFE hardly contains the push-pull component.

This means that quality deterioration of the focus error signal SFE due to leakage of the push-pull component can be prevented even in the cases where there is an error of the attachment position of the photodetector 89 and the wavefront aberration in the reflected light beam LR is great.

Accordingly, the signal processing unit 73 can generate the high-quality focus error signal SFE from which the influence by the lens shift has been eliminated. Thereby, the focus control part 12AF can perform focus control with extremely high accuracy from which the influence by the lens shift has been eliminated.

In this regard, in the areas 87E and 87F of the hologram element 87, the diffraction angles of the reflected light beams LR1E and LR1F can be made smaller than those in the first embodiment. Thereby, the pitches of the diffraction gratings formed in the areas 87E and 87F can be made larger and the difficulty of the manufacture can be reduced.

Further, in the case of using brazed holograms for the areas 87E and 87F, the diffraction efficiency can be improved by widening the pitches of the diffraction gratings, and therefore, the S/N (Signal/Noise)-ratios in the light reception signals SE and SF can be made higher.

Furthermore, the length of the photodetector 89 with respect to the longitudinal direction can be made shorter than that of the photodetector 29. Accordingly, the entire configuration of the optical pickup 77 can be made smaller than that of the optical pickup 17.

Moreover, in the optical pickup 77, in its assembly process or the like, the attachment positions, attachment angles, etc. of the hologram element 87, the photodetector 89, etc. are adjusted using the detection results in the light receiving parts DA and DJ. Especially, in the third embodiment, the spot TJ is expanded (FIG. 22) compared to that in the first embodiment.

In the case where the spot TJ is collected, when the attachment positions and the attachment angles of the photodetector 89 etc. are slightly adjusted, the values of the light reception signals SJA to SJD may exhibit "peaky characteristics" to be completely unchanged or sharply and greatly changed, and the adjustment operation may become extremely difficult.

On the other hand, in the case where the spot TJ is expanded as in the third embodiment, when the attachment positions and the attachment angles of the photodetector 89 etc. are slightly adjusted, the values of the light reception signals SJA to SJD are gradually or greatly changed to some degree.

Thereby, in the adjustment operation or the like, for example, judgments as to "in which directions they should be moved to the optimum attachment positions" can be made. As a result, the adjustment operation in the assembly process of the optical pickup 77 can be made simpler and the necessary time can be shortened.

Further, the optical disc device 70 has the same advantages as those of the first embodiment in other respects.

According to the configuration, the optical pickup 77 of the optical disc device 70 diffracts the reflected light beam LR using the hologram element 87. The hologram element advances the reflected light beam LR0 containing no push-pull component straight, separates and advances the reflected light beams LR1E and LR1F toward the inner circumference side and the outer circumference side in the longitudinal direction, and advances the reflected light beams LR1G and LR1H in the lateral direction, respectively. The photodetector 89 generates the light reception signals S using the stray light receiving areas respectively provided adjacent to the light receiving areas RE and RF separated by the distance d2 in the lateral direction, the light receiving areas RG and RH, and the light receiving areas RE, RF, RG, and RH. The optical disc device 70 can eliminate the influence of the stray light patterns W and the lens shift and perform high-accuracy tracking control by calculating the tracking error signal STE2 according to the expression (5) using the light reception signals S.

4. Other Embodiments

In the above described first embodiment, the case where the detection parts DE and DF are provided nearly symmetrically with the virtual straight line V1 as a symmetric axis has been described.

The embodiments of the invention are not limited to the case, but the parts may be located in arbitrary positions shifted from the symmetric positions. In this case, it may be preferable that the diffraction directions in the areas 27E and 27F of the hologram element 27 are made different and the distance d2 between the light receiving parts DE and DF satisfies the expression (2). Thereby, it may be preferable that the stray light pattern WF and the other layer diffraction interlayer stray light pattern WMF do not overlap with the detection part DE, and the stray light pattern WE and the other layer diffraction interlayer stray light pattern WME do not overlap with the detection part DF. The same is applicable to the second and third embodiments.

Further, in the above described first embodiment, the case where the detection parts DG and DH are provided along the virtual straight line V2 at the outer circumference side of the reference point P2 (FIG. 10) has been described. The embodiments of the invention are not limited to the case, but the detection parts DG and DH may be provided in positions off the virtual straight line V2, or both or one of the detection parts DG and DH may be provided at the inner circumference side of the reference point P2. The same is applicable to the second and third embodiments.

Furthermore, in the above described first embodiment, the case where the stray light receiving areas REG1, REG2, RHN1, and RHN2 are respectively provided in the light receiving parts DG and DH has been described.

The embodiments of the invention are not limited to the case, but, when the tracking control is performed using the tracking error signal STE2 calculated according to the expression (5), that is, when the light reception signals SGN and SHN are not used, the stray light receiving areas REG1, REG2, RHN1, and RHN2 may be omitted. The same is applicable to the third embodiment.

Furthermore, in the above described first embodiment, the case where the stray light receiving areas REN1 and REN2 are formed adjacent to the light receiving area RE in the light receiving part DE of the photodetector 29 has been described.

The embodiments of the invention are not limited to the case, but only one of the stray light receiving area REN1 and REN2 may be provided, or the areas may be separated from the light receiving area RE. Further, their shape may be shapes other than rectangular shapes. In other words, it may be preferable that an amount of light having a correlation with the amount of light of the stray light pattern WE overlapping with the light receiving area RE is detected by the stray light receiving area REN1 and the like. In this case, it is desirable that, in consideration of the side at the light receiving part DE side in the stray light pattern WE is linearly formed along the nearly longitudinal direction, the sizes, positions, etc. of the stray light receiving area REN1 and the like may be made the same as those of the light receiving area RE with respect to the lateral direction. The same is applicable to the stray light receiving areas RFN1 and RFN2, and the same is applicable to the second and third embodiments.

Further, in the above described second embodiment, the case where the stray light receiving areas RGN1 and RGN2 are formed adjacent to the light receiving area RG in the light receiving part DG of the photodetector 29 has been described.

The embodiments of the invention are not limited to the case, but only one of the stray light receiving area RGN1 and RGN2 may be provided, or the areas may be separated from the light receiving area RG. Further, their shape may be shapes other than rectangular shapes. In other words, it may be preferable that an amount of light having a correlation with the amount of light of the stray light pattern WE overlapping with the light receiving area RE, especially, an amount of light showing a nearly proportional relation to the characteristic curve Q1 (FIG. 19A) when $dn<dn1$ is detected by the stray light receiving area REN1 and the like.

Further, in the above described first embodiment, the case where the parts of the reflected light beam LR are respectively diffracted by the diffraction gratings respectively formed in the respective areas 27E to 27J of the hologram element 27 has been described.

The embodiments of the invention are not limited to the case, but the reflected light beam LR may be divided with respect to each area by other various optical elements and they may be respectively advanced to desired directions by optical actions of diffraction or the like. The same is applicable to the second and third embodiments.

Further, in the third embodiment, the case where the aberration to the degree that astigmatism provided by the cylindrical lens 28 is not completely canceled is provided by the diffraction grating formed in the area 87J of the hologram element 87 has been described.

The embodiments of the invention are not limited to the case, but aberration of another component such as defocus may be provided by the diffraction grating formed in the area 87J, in other words, it may be preferable that the spot TJ formed in the photodetector 89 is not collected so much and is diffused to some degree.

Furthermore, in the above described third embodiment, the case where the aberration to the degree that astigmatism provided by the cylindrical lens 28 is not completely canceled is provided by the diffraction grating formed in the area 87J of the hologram element 87 has been described.

The embodiments of the invention are not limited to the case, but the aberration to the degree that astigmatism provided by the cylindrical lens 28 is not completely canceled may be provided by the diffraction grating formed in the area 27J of the hologram element 27 also in the first and second embodiments.

Moreover, in the above described first embodiment, the case where the light receiving part DJ is divided into four by division lines forming angles of about 45 degrees relative to the longitudinal direction and the lateral direction has been described.

The embodiments of the invention are not limited to the case, but the light receiving part DJ may not be divided but may be a single light receiving area, or the light receiving part DJ may be divided into an arbitrary number equal to or more than two, or may be divided along arbitrary directions. In this case, calculation processing compliant with the number of division, the division pattern, or the like of the light receiving part DJ may be performed, and the attachment positions, attachment angles, etc. of the hologram element 27, the photodetector 29, etc. may be adjusted based on the calculation result. In other words, it may preferable that the light reception signals S that change according to the attachment positions, attachment angles, etc. of the hologram element 27, the photodetector 29, etc. in the optical pickup 17 can be obtained. The same is applicable to the second and third embodiments.

Furthermore, in the above described first and second embodiments, the case where four recording layers Y are provided in the optical disc 100 has been described. The embodiments of the invention are not limited to the case, but an arbitrary number equal to or more than two of recording layers Y may be provided in the optical disc 100.

In this case, even where the stray light layer distance do is the largest or smallest, it is desirable that the stray light patterns WE and WF do not overlap with the light receiving areas RE and RF. Further, even where the stray light pattern WE or WF overlaps with the light receiving area RE or RF, the stray light components may be cancelled according to the expression (5) or (6). The same is applicable to the third embodiment.

Further, in the above described first embodiment, the case where the reproduction RF signal SRF is calculated by respectively amplifying the light reception signals SA to SD using plural amplification circuits within the head amplifier 32, and then, adding them according to the expression (6) has been described.

However, the embodiments of the invention are not limited to the case, but the reproduction RF signal SRF may be calculated by adding the light reception signals SA to SD according to the expression (6), and then, amplifying the signal using the single amplification circuit within the head amplifier 32. In this case, the number of amplification circuits for use may be reduced, and thus, it may be possible to reduce the amplification noise that can be superimposed by the amplification circuits. The same is applicable to the addition part in the tracking error signal STE2, and the same is applicable to the second and third embodiments.

Moreover, in the above described first embodiment, the case where the optical disc device 10 generates the tracking error signal according to the one-beam push-pull method has been described. The embodiments of the invention are not limited to the case, but, depending on the types of the optical disc 100, a phase-contrast method such as DPD (Differential Phase Detection) may be used for a BD-ROM, and the one-beam push-pull method may be used for a BD-R, BD-RE, or the like. In this case, a tracking error signal calculation circuit compliant with the DPD method may be added to the signal processing unit 13.

Further, in the case of the first embodiment, the optical disc device 10 may be not only compliant with a single system of the BD system or the like, but also may be compliant with two or more systems including the DVD system, CD system, or the like. In this case, a laser diode that can output a light beam having a wavelength compliant with each system may be provided together with a beam splitter or the like, and a light receiving area compliant with each system may be provided in the photodetector 29. The same is applicable to the second and third embodiments.

Furthermore, in the above described first embodiment, the case where the wavelength of the light beam L1 output from the laser diode 21 is set to 405 [nm] has been described. The embodiments of the invention are not limited to the case, but a light beam having an arbitrary wavelength compliant with the optical disc 100 may be output. The same is applicable to the second and third embodiments.

Moreover, in the above described first embodiment, the case where the optical disc device 10 can perform both the recording processing and the reproduction processing of information on the optical disc 100 has been described.

However, the embodiments of the invention are not limited to the case, but the embodiments of the invention may be applied to an optical disc device that can only perform the reproduction processing of the optical disc 100, for example. The same is applicable to the second and third embodiments.

Further, in the above described embodiments, the case where the optical pickup 17 as an optical pickup includes the laser diode 21 as a light source, the objective lens 18 as an objective lens, the biaxial actuator 19 as a lens moving unit, the collective lens 26 as a collective lens, the hologram element 17 as a diffraction optical element, and the photodetector 29 as a photodetector has been described.

However, the embodiments of the invention are not limited to the case, but an optical pickup may include a light source, an objective lens, a lens moving unit, a collective lens, a diffraction optical element, and a photodetector having other various configurations.

Furthermore, in the above described embodiments, the case where the optical disc device as an optical disc device includes the laser diode 21 as a light source, the objective lens 18 as an objective lens, the biaxial actuator 19 as a lens moving unit, the collective lens 26 as a collective lens, the hologram element 17 as a diffraction optical element, the photodetector 29 as a photodetector, the signal processing unit 13 as a signal processing unit, and the servo-control part 12A as a servo-control part has been described.

However, the embodiments of the invention are not limited to the case, but an optical disc device may include a light source, an objective lens, a lens moving unit, a collective lens, a diffraction optical element, a photodetector, a signal processing unit, and a servo-control part having other various configurations.

The embodiments of the invention may be also used in an optical disc device that records information of images, sounds, various data, or the like in optical discs and reproduces the information from the optical discs.

The present application contains subject matter related to that disclosed in Japanese Priority Patent Application JP 2009-041054 filed in the Japan Patent Office on Feb. 24, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup comprising:
a light source to output a light beam;
an objective lens to collect the light beam on a target recording layer as a target of plural recording layers provided in an optical disc;
a lens moving unit to move the objective lens in a tracking direction approximately orthogonal to track grooves helically or coaxially formed in the target recording layer;
a collective lens to collect a reflected light beam formed when the light beam is reflected by the optical disc;
a diffraction optical element to, when the reflected light beam is diffracted and separated into a reflected zero-order light beam and a reflected first-order light beam:
use a first area to diffract a first part of the reflected first-order light beam in a first direction as a first beam containing +1-order rays diffracted by the track grooves of the reflected first-order light beam;
use a second area to diffract a second part of the reflected first-order light beam in a second direction different from the first direction as a second beam containing −1-order rays diffracted by the track grooves of the reflected first-order light beam;
use a third area corresponding to an inner circumference side of the optical disc to diffract a third part of the reflected first-order light beam in a third direction different from either the first direction or the second direction as a third beam which substantially does not contain +1-order rays and −1-order rays diffracted by the track grooves of the reflected first-order light beam; and
use a fourth area corresponding to an outer circumference side of the optical disc to diffract a fourth part of the reflected first-order light beam in the third direction as a fourth beam which substantially does not contain +1-order rays and −1-order rays diffracted by the track grooves of the reflected first-order light beam; and
a photodetector to:
receive the first beam and the second beam using a first light receiving area and a second light receiving area respectively provided at a first side in the first direction and a second side in the second direction in an application position of the reflected zero-order light beam, respectively, and generate first and second light reception signals; and
receive the third beam and the fourth beam using a third light receiving area and a fourth light receiving area respectively provided at sides in the third direction in the application position of the reflected zero-order light beam, respectively, and generate third and fourth light reception signals,
wherein a signal processing unit is configured to generate a tracking error signal representing an amount of shift of a focus of the light beam with respect to the tracking direction from a center line of the track grooves based on the first light reception signals, second light reception signals, third light reception signals and fourth light reception signals respectively generated by the first light receiving area, the second light receiving area, the third light receiving area, and the fourth light receiving area; and
a servo-control part is configured to move the objective lens in the tracking error direction via the lens moving unit based on the tracking error signal.

2. The optical pickup according to claim 1, wherein the diffraction optical element advances the first beam in the first direction forming a predetermined angle relative to a running direction in an image of the track grooves, advances the second beam in the second direction substantially symmetric to the first direction with respect to a direction substantially parallel to the running direction as the second direction, and advances the third beam and the fourth beam in a direction substantially orthogonal to the running direction as the third direction.

3. The optical pickup according to claim 2, wherein the diffraction optical element advances the first beam and the second beam in the first direction and the second direction, respectively, with diffraction angles of the beams approximately equal to each other, and advances the third beam and the fourth beam in the third direction with diffraction angles of the beams different from each other, and
in the photodetector, the first light receiving area and the second light receiving area are respectively provided in positions nearly symmetric with respect to the running direction, and the third light receiving area and the fourth light receiving area are provided on a straight line passing through the application position of the reflected zero-order light beam and being extended in the third direction.

4. The optical pickup according to claim 3, wherein, given that a distance between a boundary line between a fifth area including a center part except the first area, the second area, the third area, and the fourth area and the first area or the second area in the diffraction optical element and a boundary line between the third area and the fourth area in the diffraction optical element is $d1$,
a distance between a point representing approximately a center of the first light receiving area and a point representing nearly a center of the second light receiving area on the photodetector is $d2$,
a radius of the reflected light beam when entering the diffraction optical element is $r1$, and
a radius at the maximum of a zero-order stray light spot formed on the photodetector by zero-order stray light not diffracted but transmitted by the diffraction optical element of interlayer stray light when a part of the light beam is reflected by another recording layer than the target recording layer in the optical disc is $r2$, the following expression (1)

$$d2 \geq r2 \times \left(1 + \frac{d1}{r1}\right) \quad (1)$$

is satisfied.

5. The optical pickup according to claim 3, wherein the diffraction optical element diffracts a part of the reflected first-order light beam in a fourth direction different from all of the first direction, the second direction, and the third direction as a fifth beam using a fifth area including a center part except the first area, the second area, the third area, and the fourth area, and the photodetector receives the fifth beam using a fifth light receiving area provided at a fifth side in the fourth direction in the application position of the zero-order light beam and generates a fifth light reception signal.

6. The optical pickup according to claim 5, wherein the diffraction optical element provides predetermined aberration to the fifth beam, and thereby, expands a spot formed by the fifth beam on a light receiving surface of the photodetector larger than spots respectively formed by the first beam, the second beam, the third beam, and the fourth beam.

7. The optical pickup according to claim 5, wherein, in the photodetector, the fifth light receiving area is divided at least into two or more.

8. The optical pickup according to claim 1, wherein, in the photodetector, stray light receiving areas that receive interlayer stray light formed when a part of the light beam is reflected by another recording layer than the target recording layer in the optical disc are provided close to the first light receiving area and the second light receiving area.

9. The optical pickup according to claim 1, wherein, in the photodetector, stray light receiving areas that receive interlayer stray light formed when a part of the light beam is reflected by another recording layer than the target recording layer in the optical disc are respectively provided close to the third light receiving area and the fourth light receiving area.

10. The optical pickup according to claim 1, wherein the first light receiving area and the second light receiving area of the photodetector are respectively provided so that at most one of another +1-order spot and another −1-order spot formed by another +1-order light beam and another −1-order light beam of +1-order rays and −1-order rays when a fifth part of the light beam is reflected and diffracted by tracks formed in another recording layer than the target recording layer in the optical disc, respectively, may be applied.

11. The optical pickup according to claim 1, wherein, in the photodetector, the first light receiving area, the second light receiving area, the third light receiving area, and the fourth light receiving area are provided outside of an application range of the zero-order light beam generated when an interlayer stray light beam formed by a part of the light beam reflected by another recording layer farthest apart from the target recording layer in the optical disc is diffracted by the diffraction optical element.

12. The optical pickup according to claim 11, wherein the diffraction optical element diffracts nearly the entire reflected light beam as the first beam and the second beam in the first area and the second area, and the photodetector receives the reflected zero-order light beam that does not contain parts corresponding to the first area and the second area using the zero-order light receiving part.

13. An optical disc device comprising:

a light source to output a light beam;

an objective lens to collect the light beam on a target recording layer as a target of plural recording layers provided in an optical disc;

a lens moving unit to move the objective lens in a tracking direction approximately orthogonal to track grooves helically or coaxially formed in the target recording layer;

a collective lens that collects a reflected light beam formed when the light beam is reflected by the optical disc;

a diffraction optical element to, when the reflected light beam is diffracted and separated into a reflected zero-order light beam and a reflected first-order light beam:

use a first area to diffract a first part of the reflected first-order light beam in a first direction as a first beam containing +1-order rays diffracted by the track grooves of the reflected first-order light beam;

use a second area to diffract a second part of the reflected first-order light beam in a second direction different from the first direction as a second beam containing −1-order rays diffracted by the track grooves of the reflected first-order light beam;

use a third area corresponding to an inner circumference side of the optical disc to diffract a third part of the reflected first-order light beam in a third direction different from either the first direction or the second direction as a third beam which substantially does not contain +1-order rays and −1-order rays diffracted by the track grooves of the reflected first-order light beam; and use a fourth area corresponding to an outer circumference side of the optical disc to diffract a fourth part of the reflected first-order light beam in the third direction as a fourth beam which substantially does not contain +1-order rays and −1-order rays diffracted by the track grooves of the reflected first-order light beam;

a photodetector to:

receive the first beam and the second beam using a first light receiving area and a second light receiving area respectively provided at a first side in the first direction and a second side in the second direction in an application position of the reflected zero-order light beam, respectively, and first and second light reception signals; and receive the third beam and the fourth beam using a third light receiving area and a fourth light receiving area respectively provided at sides in the third direction in the application position of the reflected zero-order light beam, respectively, and generate third and fourth light reception signals;

a signal processing unit to generate a tracking error signal representing an amount of shift of a focus of the light beam with respect to the tracking direction from a center line of the track grooves based on the first light reception signals, second light reception signals, third light reception signals and fourth light reception signals respectively generated by the first light receiving area, the second light receiving area, the third light receiving area, and the fourth light receiving area; and a servo-control part to move the objective lens in the tracking error direction via the lens moving unit based on the tracking error signal.

14. The optical disc device according to claim 13, wherein, in the photodetector, stray light receiving areas that receive interlayer stray light formed when a part of the light beam is reflected by another recording layer than the target recording layer in the optical disc are respectively, provided close to the first light receiving area, the second light receiving area, the third light receiving area, and the fourth light receiving area.

15. The optical disc device according to claim 14, wherein the signal processing unit generates the tracking error signal based on light reception results by the stray light receiving areas in addition to the light reception signals.

* * * * *